United States Patent
Kim et al.

(10) Patent No.: US 11,590,976 B2
(45) Date of Patent: Feb. 28, 2023

(54) APPARATUS AND METHOD FOR CONTROLLING SPEED IN COOPERATIVE ADAPTIVE CRUISE CONTROL SYSTEM

(71) Applicants: Hyundai Motor Company, Seoul (KR); Kia Corporation, Seoul (KR)

(72) Inventors: Yoon Soo Kim, Gyeonggi-do (KR); Myung Seon Heo, Seoul (KR); Dong Gyu Noh, Gyeonggi-do (KR); Young Chul Oh, Gyeonggi-do (KR); In Yong Jung, Gyeonggi-do (KR); Su Lyun Sung, Seoul (KR); Hyoung Geun Kwon, Gyeonggi-do (KR); Dae Sung Hwang, Gyeonggi-do (KR); Ki Cheol Shin, Gyeonggi-do (KR); Jong Rok Park, Seoul (KR); Cho Rong Ryu, Incheon (KR); Jun Sik Hwang, Gyeonggi-do (KR); Min Byeong Lee, Gyeonggi-do (KR); Seung Wook Park, Gyeonggi-do (KR); Hahk Rel Noh, Gyeonggi-do (KR); Byung Yong You, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 70 days.

(21) Appl. No.: 17/355,432

(22) Filed: Jun. 23, 2021

(65) Prior Publication Data

US 2021/0316726 A1 Oct. 14, 2021

Related U.S. Application Data

(63) Continuation of application No. 15/833,496, filed on Dec. 6, 2017, now Pat. No. 11,066,070, which is a (Continued)

(30) Foreign Application Priority Data

Oct. 15, 2015 (KR) .................. 10-2015-0143937
Dec. 30, 2016 (KR) .................. 10-2016-0184294

(51) Int. Cl.
*B60W 50/14* (2020.01)
*B60W 30/16* (2020.01)
(Continued)

(52) U.S. Cl.
CPC .......... *B60W 30/143* (2013.01); *B60W 30/16* (2013.01); *B60W 50/14* (2013.01);
(Continued)

(58) Field of Classification Search
CPC .... B60W 30/143; B60W 30/16; B60W 50/14; B60W 2050/0027; B60W 2552/30;
(Continued)

(56) References Cited

U.S. PATENT DOCUMENTS 8,352,111 B2   1/2013 Mudalige
2001/0037165 A1   11/2001 Shirai et al.
(Continued)

FOREIGN PATENT DOCUMENTS

EP   0726473 A2   8/1996
JP   H10338055 A   12/1998
(Continued)

OTHER PUBLICATIONS

Moon, S. et al., "Multi-vehicle target selection for adaptive cruise control", vol. 48, No. 11 (Nov. 2010) pp. 1325-1343.
(Continued)

*Primary Examiner* — Peter D Nolan
*Assistant Examiner* — Ashley L Redhead, Jr.
(74) *Attorney, Agent, or Firm* — Fox Rothschild LLP

(57) ABSTRACT

An apparatus and method for controlling a vehicle speed based on information about forward vehicles that travel in
(Continued)

the same lane may be acquired using Vehicle to Everything (V2X) communications in a cooperative adaptive cruise control (CACC) system. The CACC system includes a communication unit receiving vehicle information from neighboring vehicles using V2V communications; an information collection unit collecting vehicle information of the neighboring vehicles and the subject vehicle using sensors; and a control unit determining a forward vehicle and a far-forward vehicle using the sensors, selecting first and second target vehicles for being followed by the subject vehicle based on the vehicle information of the forward vehicle and the far-forward vehicle and the vehicle information of the neighboring vehicles, and controlling the driving speed of the subject vehicle based on speed information of the first and second target vehicles.

18 Claims, 13 Drawing Sheets

Related U.S. Application Data continuation-in-part of application No. 15/087,085, filed on Mar. 31, 2016, now Pat. No. 10,000,212.

(51) Int. Cl.
  *B60W 30/14* (2006.01)
  *G08G 1/16* (2006.01)
  *B60W 50/00* (2006.01)
(52) U.S. Cl.
  CPC ..... *G08G 1/161* (2013.01); *B60W 2050/0027* (2013.01); *B60W 2552/30* (2020.02); *B60W 2554/4041* (2020.02); *B60W 2554/801* (2020.02); *B60W 2554/804* (2020.02); *B60W 2556/65* (2020.02); *B60W 2720/10* (2013.01); *B60W 2754/50* (2020.02)
(58) Field of Classification Search
  CPC ... B60W 2554/4041; B60W 2554/801; B60W 2554/804; B60W 2556/65; B60W 2720/10; B60W 2754/50; G08G 1/161
  See application file for complete search history.

(56) References Cited

U.S. PATENT DOCUMENTS

| | | |
|---|---|---|
| 2003/0195704 A1 | 10/2003 | Sekiguchi |
| 2004/0061626 A1 | 4/2004 | Kubota |
| 2004/0149504 A1 | 8/2004 | Swoboda et al. |
| 2004/0176900 A1 | 9/2004 | Yajima |
| 2005/0171675 A1 | 8/2005 | Sawamoto et al. |
| 2006/0155469 A1 | 7/2006 | Kawasaki |
| 2009/0125203 A1 | 5/2009 | Lindqvist et al. |
| 2010/0198477 A1 | 8/2010 | Shirai |
| 2012/0200450 A1 | 8/2012 | Ishimori et al. |
| 2012/0306634 A1 | 12/2012 | Tsuda et al. |
| 2013/0179379 A1 | 7/2013 | Kurumisawa et al. |
| 2013/0257388 A1 | 10/2013 | Lee |
| 2015/0112580 A1 | 4/2015 | Sudou et al. |
| 2015/0242944 A1 | 8/2015 | Willard et al. |
| 2016/0200319 A1 | 7/2016 | Nemoto |
| 2016/0297447 A1 | 10/2016 | Suzuki |
| 2016/0375905 A1 | 12/2016 | Park et al. |
| 2017/0015313 A1 | 1/2017 | Mei et al. |
| 2019/0044728 A1* | 2/2019 | Karmoose ............. H04L 9/0643 |
| 2021/0012661 A1* | 1/2021 | Yang ...................... G08G 1/167 |

FOREIGN PATENT DOCUMENTS

| | | |
|---|---|---|
| JP | 2000-057500 A | 2/2000 |
| JP | 3327217 B2 | 9/2002 |
| JP | 2004030195 A | 1/2004 |
| JP | 2004038820 A | 2/2004 |
| JP | 2005-231490 A | 9/2005 |
| JP | 2007176290 A | 7/2007 |
| JP | 2009227256 A | 10/2009 |
| JP | 4371001 B2 | 11/2009 |
| JP | 2009-280014 A | 12/2009 |
| JP | 4600174 B2 | 12/2010 |
| JP | 2011-173459 A | 9/2011 |
| JP | 2013-061274 A | 4/2013 |
| JP | 2013158217 A | 8/2013 |
| JP | 2017058257 A | 3/2017 |
| KR | 10-1511860 B1 | 9/2002 |
| KR | 10-2015-0056000 A | 5/2015 |

OTHER PUBLICATIONS

Krook, J. et al., "Extended Adaptive Cruise Control based on multiple target information", Dept. of Signals and Systems, Chalmers Univ. of Technology, Gothenburg, Sweden, Report No. EX062/2013 (2013).
Mertz, C. et al., "Moving Object Detection with Laser Scanners", Jrl. of Field Robotics, 30(1), pp. 17-43 (2013).
Extended European Search Report for European Patent Application No. 17205450.4, dated Apr. 25, 2018, 10 pages.

* cited by examiner

APPARATUS AND METHOD FOR CONTROLLING SPEED IN COOPERATIVE ADAPTIVE CRUISE CONTROL SYSTEM

CROSS-REFERENCE TO RELATED APPLICATIONS

This application is a continuation of U.S. patent application Ser. No. 15/833,496 filed on Dec. 6, 2017, which is a continuation-in-part (CIP) of U.S. patent application Ser. No. 15/087,085, filed on Mar. 31, 2016, and claims under 35 U.S.C. § 119(a) the benefit of Korean Patent Application Nos. 10-2015-0143937 and 10-2016-0184294, filed on Oct. 15, 2015 and Dec. 30, 2016, respectively, the entire contents of which are incorporated herein by reference.

BACKGROUND

(a) Technical Field

Exemplary embodiments of the present disclosure relate to an apparatus and method for controlling a speed in a cooperative adaptive cruise control (hereinafter referred to as a "CACC") system, and more particularly, to an apparatus and method for controlling a vehicle speed based on information about a plurality of forward vehicles that travel in the same lane, which is acquired using V2X (Vehicle to Everything) communications.

(b) Description of the Related Art

An adaptive cruise control (hereinafter referred to as "ACC") system is a system which operates to perform automated driving at a speed that is equal to or lower than that set by a driver and to maintain an inter-vehicle distance from a target vehicle that is equal to or larger than a predetermined distance. The ACC system provides a following function for maintaining the vehicle distance enough to prevent collision with a forward target vehicle, which is acquired by distance and/or position measurement sensors mounted on the vehicle, or a cruise function for performing automated driving at the speed set by the user.

The ACC system can enable the driver not to continuously operate an accelerator pedal in order to adjust the driving speed of the vehicle to provide convenience to the driver, and can achieve safety driving by maintaining the predetermined distance to the target vehicle and preventing the vehicle from driving over the set speed.

On the other hand, a CACC system is a system that can improve the ACC function through addition of V2X (Vehicle to Everything) communications to the above-described ACC system. The CACC system may receive the speed limit of a road through V2I (Vehicle to Infrastructure), receive information on a target vehicle that travels in the same lane through V2V (Vehicle to Vehicle), and then improve the ACC performance based on the received information.

However, since the CACC system in the related art adjusts the speed of a subject vehicle based on the speed of the target vehicle after setting a forward vehicle that is just in front of the subject vehicle as the target vehicle, sudden start or sudden acceleration may frequently occur.

SUMMARY

The present disclosure provides a CACC system and a control method thereof, which can determine a driving speed based on driving information of a forward vehicle and a far-forward vehicle.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, a cooperative adaptive cruise control (hereinafter referred to as "CACC") system that is provided in a subject vehicle to control a driving speed of the subject vehicle includes a communication unit configured to receive vehicle information including position and driving information from neighboring vehicles using V2V (Vehicle to Vehicle) communications; an information collection unit configured to collect vehicle information of the neighboring vehicles and vehicle information of the subject vehicle using sensors provided on the subject vehicle; and a control unit configured to determine a forward vehicle and a far-forward vehicle using the sensors provided on the subject vehicle, to select a first target vehicle for being followed by the subject vehicle and a second target vehicle for being followed by the first target vehicle based on the vehicle information of the forward vehicle and the far-forward vehicle and the vehicle information of the neighboring vehicles acquired by the communication unit, and to control the driving speed of the subject vehicle based on speed information of the selected first target vehicle and second target vehicle.

The CACC system according to the aspect of the present disclosure may further include a driving unit configured to control a throttle and a brake and/or a driver vehicle interface (DVI) unit configured to notify a driver of state information of the CACC system, wherein the control unit controls the driving unit to control the driving speed of the subject vehicle.

The control unit may include a state management unit configured to manage the state of the CACC system; a target vehicle selection unit configured to determine the forward vehicle and the far-forward vehicle using the sensors provided on the subject vehicle, and to select the first target vehicle for being followed by the subject vehicle and the second target vehicle for being followed by the first target vehicle based on the vehicle information of the forward vehicle and the far-forward vehicle and the vehicle information of the neighboring vehicles acquired by the communication unit; and a driving management unit configured to control the driving speed of the subject vehicle based on the speed information of the selected first target vehicle and second target vehicle.

The state management unit may display the state of the CACC system as one of an off state in which the CACC system does not operate, a standby state in which the CACC system operates, but does not control the driving speed of the subject vehicle, an ACC activation state in which the driving speed of the subject vehicle is controlled using only the information that is acquired from the subject vehicle in a state where there is no vehicle in a region of interest that is connected through the V2V communications, and a cooperative activation state in which there is the neighboring vehicle in the region of interest that is connected through the V2V communications, and the driving speed of the subject vehicle is controlled using the information from the neighboring vehicle that is acquired through the V2V communications and the information that is acquired from the subject vehicle.

The information collection unit may include a distance sensor configured to sense a front object, wherein the target vehicle selection unit determines existence of the forward vehicle and the far-forward vehicle that travel in the same lane as the lane of the subject vehicle based on the sensing result of the distance sensor.

The target vehicle selection unit may determine, as the forward vehicle, an object in the driving lane of the subject vehicle that has a width that is equal to or larger than a first predetermined reference width according to the sensing result of the distance sensor. The target vehicle selection unit may determine, as the far-forward vehicle, an object in the driving lane of the subject vehicle that has a width that is equal to or larger than a second reference width that is acquired through a position of the forward vehicle according to the sensing result of the distance sensor.

The target vehicle selection unit may determine, as the far-forward vehicle, an object that has a width that is equal to or larger than the second reference width for a predetermined reference time if a curvature of the driving lane of the subject vehicle is smaller than a predetermined reference curvature. The target vehicle selection unit may determine, as the far-forward vehicle, an object of which the width is increased for the reference time among objects that have widths that are equal to or larger than the second reference width.

The target vehicle selection unit may acquire the second reference width based on a distance from the front object and the position of the forward vehicle. The target vehicle selection unit may determine, as the far-forward vehicle, an object of which plural surfaces are sensed by the distance sensor and which has a width that is equal to or larger than the second reference width if the curvature of the driving lane is equal to or larger than a predetermined reference curvature. The target vehicle selection unit may determine an object that is closest to the forward vehicle as the far-forward vehicle if a plurality of objects that have widths that are equal to or larger than the second reference width are sensed by the distance sensor.

The driving management unit may control the subject vehicle to travel according to any one of a first driving speed that corresponds to driving information of the first target vehicle and a second driving speed that corresponds to driving information of the second target vehicle. The driving management unit may control the subject vehicle to travel according to one of the first driving speed and the second driving speed that has a smaller value than the value of the other.

The driving management unit may control the subject vehicle to travel at a driving speed that is determined according to driving information of the first target vehicle and the second target vehicle when the first target vehicle secedes from a driving lane of the subject vehicle if a curvature of the driving lane of the subject vehicle is smaller than a predetermined first reference curvature. The driving management unit may determine whether the first target vehicle secedes from the driving lane of the subject vehicle using a speed and a position of the first target vehicle acquired from the sensing result of the distance sensor.

The distance sensor may include a lidar.

The information collection unit may further include a camera that acquires a front image, wherein the target vehicle selection unit acquires information of a lane in which the subject vehicle travels from the front image that is acquired by the camera.

In accordance with another aspect of the present disclosure, a method for controlling a speed in a cooperative adaptive cruise control (hereinafter referred to as "CACC") system that is provided in a subject vehicle to control a driving speed of the subject vehicle includes: acquiring, by a communication unit, vehicle information of neighboring vehicles using V2V communications; determining, by a controller, a forward vehicle and a far-forward vehicle using sensors provided on the subject vehicle; determining, by the controller, a first target vehicle and a second target vehicle through comparison of vehicle information of the subject vehicle with vehicle information of the forward vehicle and the far-forward vehicle; determining, by the controller, the driving speed of the subject vehicle using driving information of the first target vehicle and the second target vehicle; and controlling, by the controller, the subject vehicle according to the determined driving speed.

The determining the forward vehicle and the far-forward vehicle using the sensors of the subject vehicle may include sensing front objects; determining the forward vehicle that travels in the same lane as a driving lane of the subject vehicle based on the sensing result; and determining the far-forward vehicle using a position of the determined forward vehicle.

The determining the forward vehicle may determine, as the forward vehicle, an object in the driving lane of the subject vehicle that has a width that is equal to or larger than a predetermined first reference width according to the sensing result. The determining the far-forward vehicle may determine, as the far-forward vehicle, an object in the driving lane of the subject vehicle that has a width that is equal to or larger than a second reference width that is acquired through a position of the forward vehicle according to the sensing result.

The determining the far-forward vehicle may determine, as the far-forward vehicle, an object that has a width that is equal to or larger than the second reference width for a predetermined reference time if a curvature of the driving lane is smaller than a predetermined reference curvature. The determining the far-forward vehicle may determine, as the far-forward vehicle, an object of which the width is increased for the reference time among objects that have widths that are equal to or larger than the second reference width.

The determining the far-forward vehicle may include acquiring the second reference width based on a distance from the front object and the position of the forward vehicle; and determining, as the far-forward vehicle, an object in the driving lane of the subject vehicle that has a width that is equal to or larger than the acquired second reference width. The determining the far-forward vehicle may determine, as the far-forward vehicle, an object of which plural surfaces are sensed and which has a width that is equal to or larger than the second reference width if a curvature of the driving lane is equal to or larger than a predetermined reference curvature. The determining the far-forward vehicle may determine an object that is closest to the forward vehicle as the far-forward vehicle if a plurality of objects that have widths that are equal to or larger than the second reference width are sensed.

The determining the driving speed of the subject vehicle using the driving information of the first target vehicle and the second target vehicle may include acquiring a first driving speed that corresponds to driving information of the first target vehicle; acquiring a second driving speed that corresponds to driving information of the second target vehicle; and determining the driving speed of the subject vehicle according to any one of the first driving speed and the second driving speed. The determining the driving speed of the subject vehicle according to any one of the first driving speed and the second driving speed may include determining one of the first driving speed and the second driving speed that has a smaller value than the value of the other as the driving speed of the subject vehicle.

The determining the driving speed of the subject vehicle using the driving information of the first target vehicle and the second target vehicle may include determining whether the first target vehicle secedes from the driving lane of the subject vehicle if a curvature of the driving lane of the subject vehicle is smaller than a predetermined first reference curvature; and determining the driving speed of the subject vehicle using the driving information of the first target vehicle and the second target vehicle if it is determined that the first target vehicle secedes from the driving lane of the subject vehicle. The determining whether the first target vehicle secedes from the driving lane of the subject vehicle may include determining whether the first target vehicle secedes from the driving lane of the subject vehicle using a speed and a position of the first target vehicle.

The sensing the distance from the front object may include sensing the distance from the front object using a lidar. The determining the forward vehicle and the far-forward vehicle using the sensors of the subject vehicle may further include acquiring a front image; and determining the driving lane of the subject vehicle from the front image.

According to the present disclosure, in performing the CACC system, the driving speed of the subject vehicle is determined using the driving information of the first target vehicle and the second target vehicle, and thus driving safety can be further heightened. In particular, even if the first target vehicle suddenly changes its lane in a state where the second target vehicle, rather than the first target vehicle, travels at low speed, the driving speed is determined according to the driving information of the second target vehicle, and thus safe driving environment can be provided to the driver.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
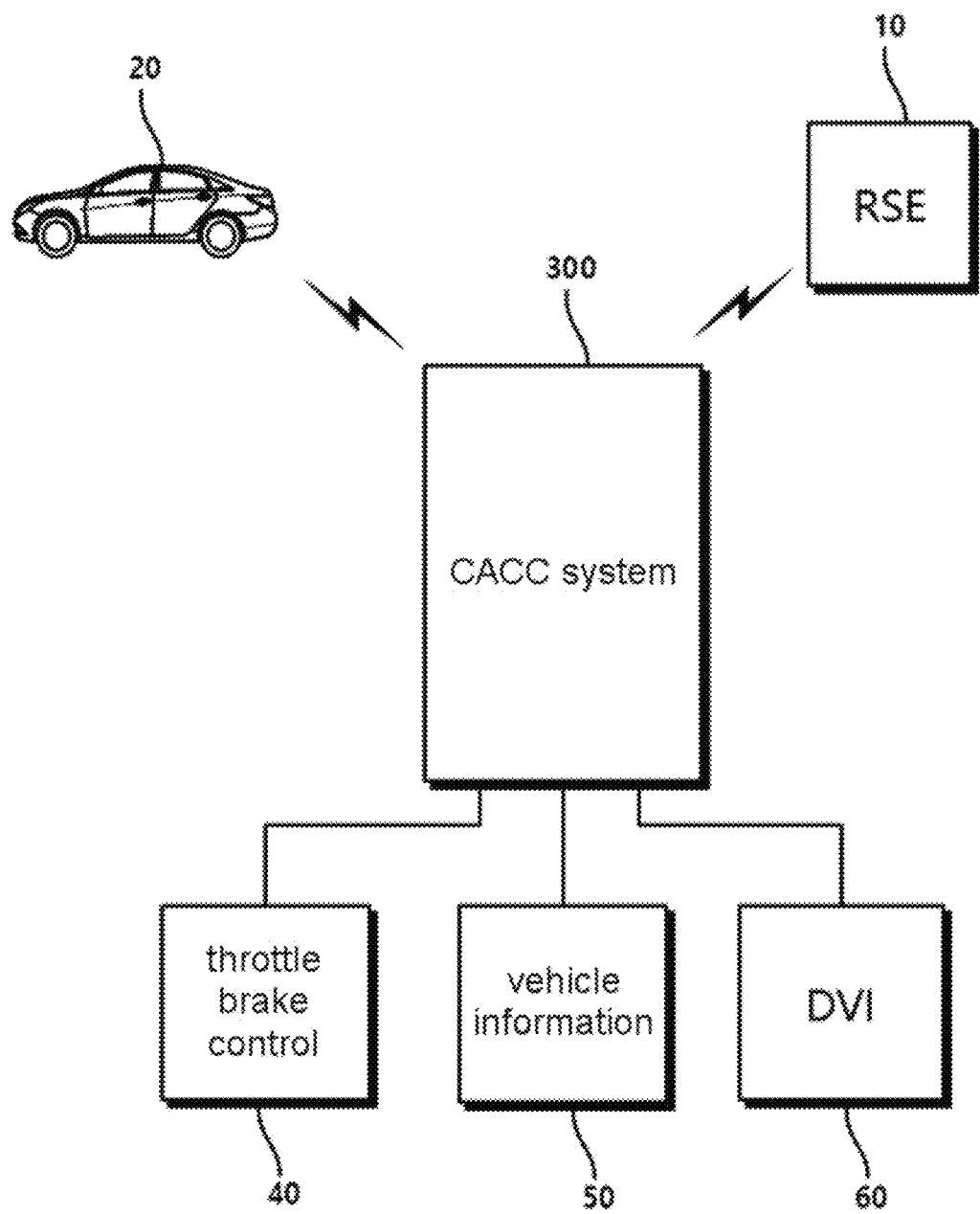
FIG. 1 is an exemplary diagram of a CACC system to which the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specially defined, all terms (including technical and scientific terms) used in the description could be used as meanings commonly understood by those ordinary skilled in the art to which the present disclosure belongs. In addition, terms that are generally used but are not defined in the dictionary are not interpreted ideally or excessively unless they have been clearly and specially defined.

Hereinafter, preferred embodiments of the present disclosure will be described in detail with reference to the accompanying drawings. The matters defined in the description, such as the detailed construction and elements, are nothing but specific details provided to assist those of ordinary skill in the art in a comprehensive understanding of the disclosure. However, the present disclosure is not limited to the embodiments disclosed hereinafter, but can be implemented in diverse forms.

First, definitions that may be applicable to the specification as provided herein will be defined.

Forward vehicle: Vehicle that is in front of a subject vehicle and moves in the same direction along the same road of the subject vehicle.

Far-forward vehicle: Vehicle that is in front of a forward vehicle and moves in the same direction along the same road of a subject vehicle and the forward vehicle.

Clearance: Distance between an end portion of a forward vehicle and a front portion of a subject vehicle.

Region of interest: Region in which a potential vehicle of interest to be described later and a target vehicle exist, and which may exert an influence on the control of a CACC system that is provided in a subject vehicle.

Potential vehicle of interest: Vehicle which exists in a region of interest and performs V2V communications with a subject vehicle.

Target vehicle: Vehicle which is followed by a subject vehicle and which may be connected or may not be connected to a subject vehicle through V2V communications.

Time gap: Value that is calculated by the speed of a subject vehicle and a gap between a subject vehicle and a forward vehicle (time gap=gap/speed).

Hereinafter, preferred embodiments of the present disclosure will be described in detail with reference to the accompanying drawings.

FIG. 1 is an exemplary diagram of a CACC system to which the present disclosure is applied.

As illustrated in FIG. 1, a CACC system 300 that is applied to the present disclosure is a system to which wireless communications with front vehicles and/or infrastructures are added in order to strengthen the sensing capability of an ACC system in the related art. The CACC system 300 may receive a road speed limit, a time gap (time difference between a subject vehicle and a front vehicle), and/or other standard messages from road-side equipment (RSE) using V2I communications. That is, the CACC system 300 of the vehicle may receive an input of information, such as a recommended set speed or a time gap, from the regional traffic control system through the V2I communications. Further, the CACC system may receive neighboring vehicle information that includes driving information (speed and acceleration) of a neighboring vehicle 20 through V2V communications with at least one neighboring vehicle 20, or may transfer its own vehicle information to the neighboring vehicle 20. In addition, the CACC system may acquire vehicle information of a vehicle that may be in front of the subject vehicle using sensors in the related art.

In this case, the traveling vehicle information may include vehicle identification (ID) for discriminating from other vehicles, vehicle shape, size, brake performance, vehicle financial resource information including total vehicle weight, vehicle position information indicated by 3D coordinates of latitude, longitude, and altitude, vehicle progressive angle measured on the basis of due north direction, vehicle speed, acceleration, yaw rate, brake state, throttle position, and steering angle.

Further, the CACC system may receive an input of a set speed or a time gap from a driver through a driver vehicle interface (DVI) 60, and may notify the driver of state information of the CACC system. Further, the CACC system may acquire vehicle information 50 from various kinds of sensors or control devices provided inside the vehicle. The CACC system may control the speed of the vehicle through control of the throttle or brake based on various kinds of data collected through the above-described method.

As described above, through the information acquisition by the V2V communications and/or V2I communications, the CACC system can control the time gap with the front vehicle more accurately while maintaining smooth driving comport, and can respond to the speed changes by a plurality of front vehicles quite rapidly. Further, the CACC system has the advantage that it can set a shorter time gap without weakening safety or a driver's sense of stability.

Figure 2:
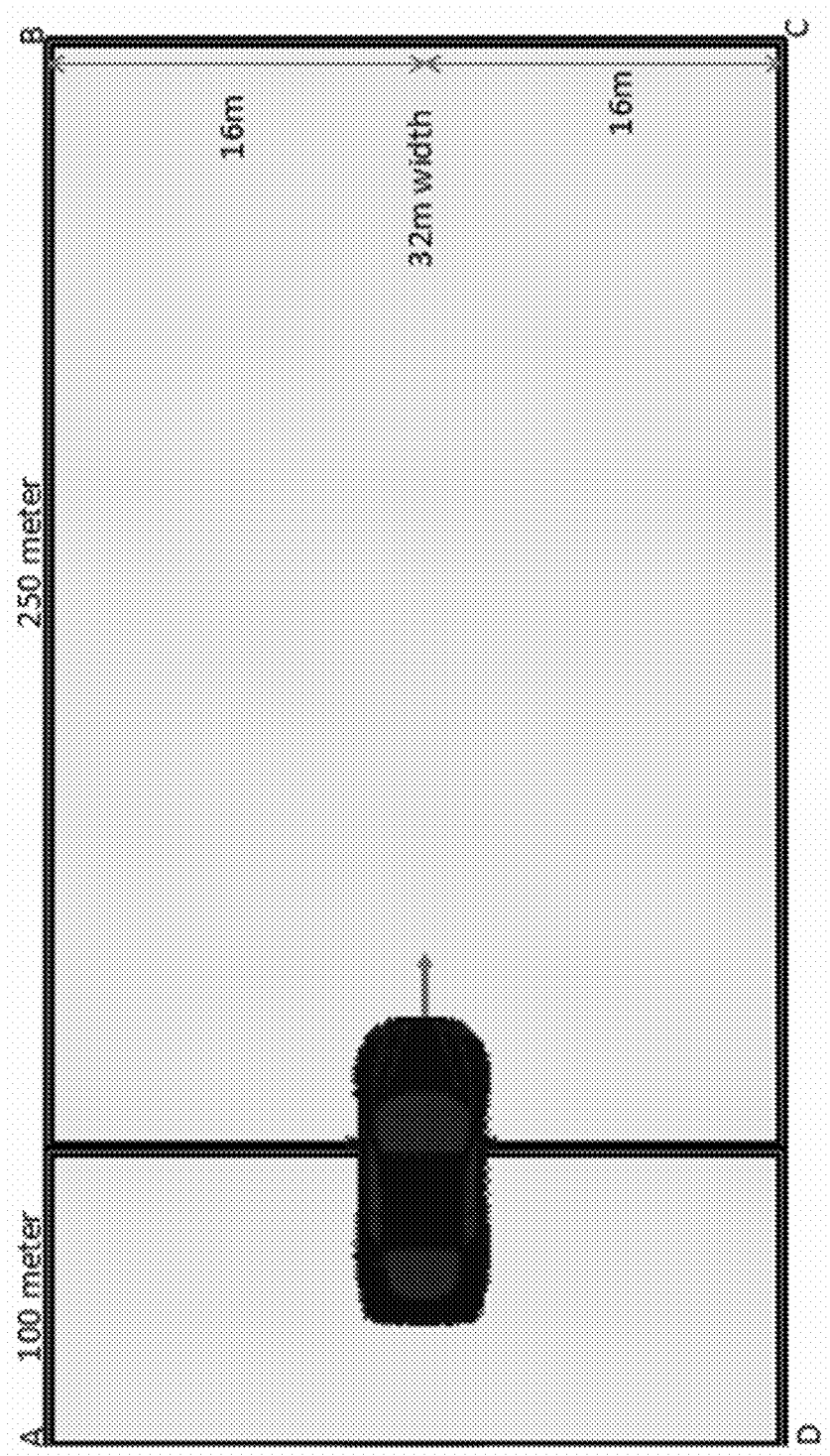
FIG. 2 is a diagram illustrating a region of interest (ROI) of a CACC system on a straight road.

FIG. 2 is a diagram illustrating a region of interest (ROI) of a CACC system on a straight road.

The CACC system may take interest in only neighboring vehicles that come into the region of interest (ROI). Information that comes from a vehicle that is out of the ROI may be considered meaningless information in controlling the vehicle. Accordingly, the CACC system may perform a control operation using only information that comes from vehicles that are within the region of interest to reduce a load that is applied to the CACC system.

Referring to FIG. 2, the region of interest may be set to have lengths of about 16 m and about 32 m in left and right directions, respectively, on the basis of the center of the vehicle in which the CACC system is mounted. Further, the region of interest may be set to have a length of about 250 m in the front direction and a length of about 100 m in the rear direction around a driver's seat. In the case of a curved road, the region of interest may be set to bend the region of interest that is set on a straight road to match the curvature of the curved road.

Further, the CACC system may set a target vehicle and a potential vehicle of interest (PVOI). The target vehicle means a front vehicle that is followed by the subject vehicle that is mounted with the CACC system. That is, the CACC system uses a distance that is maintained between the subject vehicle and the target vehicle when calculating the time gap, and the target vehicle becomes a target for which the time gap is constantly maintained. The potential vehicle of interest means a vehicle which is within the region of interest and is connected to the CACC system through the V2V communications. The potential vehicle of interest may be a vehicle that can exert an influence on the speed control of the subject vehicle that is mounted with the CACC system. A vehicle which is in a side lane and is expected to join in the lane of the subject vehicle or a vehicle which is in the same lane as the subject vehicle and the target vehicle and is in front of the target vehicle may be the potential vehicle of interest, and the potential vehicle of interest may become the target vehicle.

Figure 3:
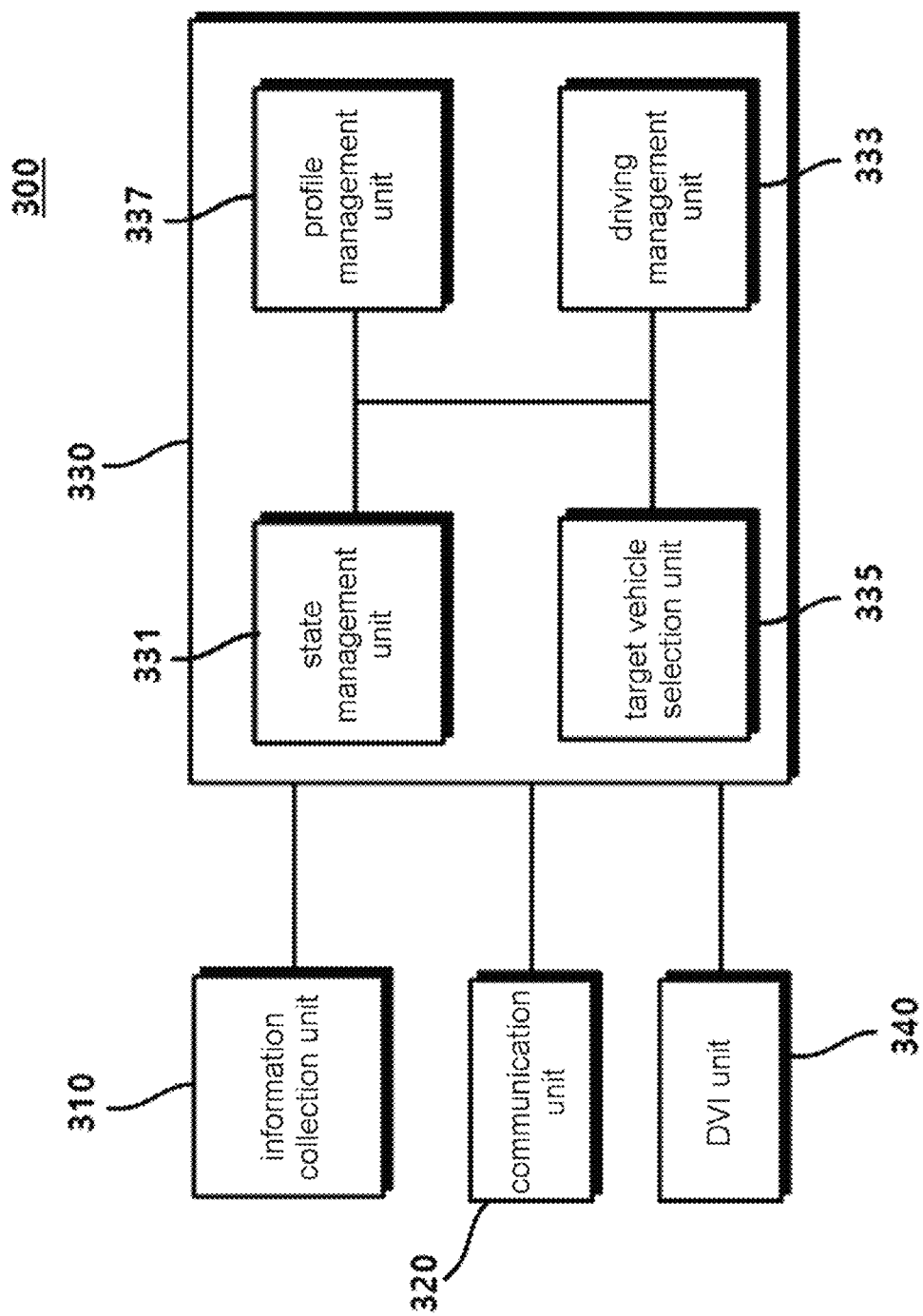
FIG. 3 is a block diagram illustrating the configuration of a CACC system according to an embodiment of the present disclosure.

FIG. 3 is a block diagram illustrating the configuration of a CACC system according to an embodiment of the present disclosure.

Referring to FIG. 3, a CACC system according to the present disclosure may include an information collection unit 310, a communication unit 320, a DVI unit 340, and a control unit 330. The control unit (or "controller") 330 may include a state management unit 331, a driving management unit 333, and a target vehicle selection unit 335, and may further include a profile management unit 337.

The communication unit 320 may receive a road speed limit, a time gap (time difference between a subject vehicle and a front vehicle), and/or other standard messages from RSE 10 based on V2I communications. That is, the CACC system 300 of the vehicle may receive not only a recommended set speed or time gap information but also information related to a road, traffic, weather, etc. from the regional traffic control system through the V2I communications. Further, the communication unit 320 may receive neighboring vehicle information that includes driving information (speed and acceleration) of a neighboring vehicle 20 through V2V communications with at least one neighboring vehicle 20, or may transfer its own vehicle information to the neighboring vehicle 20. Particularly, in this case, the communication unit may provide not only its own driving information but also identification information or driving information of a forward vehicle to the neighboring vehicle 20. In the case where the neighboring vehicle provides only the identification information, the communication unit may acquire vehicle information of a forward vehicle of the neighboring vehicle that has sent the identification information using information that comes from the neighboring vehicle having the identification information. Accordingly, the subject vehicle can acquire the vehicle information even with respect to the target vehicle and a forward vehicle of the target vehicle. On the other hand, in the case of transmitting only the identification information, the amount of data that is transmitted by the respective vehicles can be reduced.

Further, the information collection unit 310 may collect subject vehicle information that is required to control the CACC system and surrounding environment information that is collected using sensors. The subject vehicle information may include subject vehicle driving speed, throttle, and brake control information, and the surrounding environment information may include information of the neighboring vehicle 20 that is collected through the sensors. In particular, if the target vehicle exists in front of the subject vehicle, the information collection unit may collect the surrounding environment information through calculation of the driving speed of the target vehicle and a gap distance based on radar or lidar.

The DVI unit 340 may receive setting information that is input from a driver through a driver-vehicle interface, and may transfer information that is needed to be notified to the driver, such as state information of the CACC system 300 and warning information that may be generated by the CACC system 300, to the driver. As an example, the driver may input a target speed and/or target time gap through the DVI unit 340, and the CACC system 300 may operate the subject vehicle to match the input target speed and/or target time gap. As another example to be described later, the state information on whether the CACC system is in an off state, a standby state, or an activation state may be notified to the driver through the DVI unit 340.

Further, the CACC system may further include a driving unit (not illustrated). The driving unit may control a throttle and/or a brake according to a control signal of the control unit 330 to be described later.

The control unit 330 may control the driving speed of the subject vehicle based on the information that is acquired by the information collection unit 310 and the communication unit 320. That is, the control unit 330 may select a target vehicle to be followed by the subject vehicle based on the vehicle information of the neighboring vehicles that is acquired by the communication unit 320 and the driving information of the forward vehicle that is collected by the information collection unit 310, may control the driving speed of the subject vehicle based on the target speed of the subject vehicle if the target vehicle to be followed by the subject vehicle is not selected, and may control the driving speed of the subject vehicle based on speed information of the target vehicle, speed information of the subject vehicle, and the target time gap if the target vehicle to be followed by the subject vehicle is selected. In this case, a user may set the target speed and the target time gap, or the CACC system may automatically set the target speed and the target time gap to match the situation based on the information that is acquired by the information collection unit 310 and the communication unit 320.

In order to perform the above-described functions, the control unit 330 may include a state management unit 331, a driving management unit 333, and a target vehicle selection unit 335.

The target vehicle selection unit 335 may select a potential vehicle of interest and the target vehicle based on the vehicle information of a plurality of neighboring vehicles 20 that comes through the communication unit 320. The potential vehicle of interest means a neighboring vehicle that exists in the region of interest as described above. If the neighboring vehicle is within the region of interest based on position information that is received from the neighboring vehicle and position information of the subject vehicle, the corresponding neighboring vehicle may be selected and registered as the potential vehicle of interest. In addition, the forward vehicle that is just in front of the subject vehicle among the potential vehicles of interest may be selected as the target vehicle. Particularly, in the case of the target vehicle, it is required to verify the target vehicle with very high reliability, and thus the target vehicle may be selected through verification of three kinds of conditions below based on the forward vehicle information that is collected through the information collection unit 310.

1. Using position information of potential vehicles of interest, the potential vehicles of interest (hereinafter referred to as "first group of potential vehicles of interest") that travel in the same lane as the lane of the subject vehicle are selected.

2. Potential vehicles of interest (hereinafter referred to as "second group of potential vehicles of interest"), in which existence range information that is received from each potential vehicle of interest of the first group of potential vehicles of interest exists within one value of (0.1×(the range measured by the sensor)) and (0.7×(the length of each potential vehicle of interest)) that is larger than the other value, are selected. In this case, if the length of the potential vehicle of interest is not known, the value of (0.7×(the length of each potential vehicle of interest)) may be about 3.3 m.

3. Potential vehicles of interest (hereinafter referred to as "third group of potential vehicles of interest"), in which a difference between speed information that is received from each potential vehicle of interest of the second group of potential vehicles of interest and the speed that is measured by the sensor is within 1 m/s, are selected.

It is general that only one potential vehicle of interest is included in the third group of potential vehicles of interest that is selected through verification of the three kinds of conditions. However, in the case where two or more potential vehicles of interest are included in the third group of potential vehicles of interest, the potential vehicle of interest that is in the closest position may be selected as the target vehicle based on the position information of each potential vehicle of interest of the third group of potential vehicles of interest.

The above-described condition verification may be performed more accurately through comparison and determination of accumulated sample data rather than comparison and determination of one piece of sample data.

As an example, after a correlation coefficient is calculated on the basis of Equation 1 and Equation 2 below, whether the potential vehicle of interest is the target vehicle may be determined based on the calculated correlation coefficient.

$$V_{TV}(N) = V_i(N) + a_i(N)\Delta t \rightarrow V_{TV}(N) - V_i(N) = a_i(N)\Delta t \rightarrow \Delta V_i(N) = a_i(N)\Delta t \quad \text{[Equation 1]}$$

Here, N denotes the number of samples for measurement of variation of a speed and an acceleration, $V_{TV}(N)$ denotes a speed at the N-th sample of the target vehicle that is calculated on the basis of radar, and $V_i(N)$ denotes a speed at the N-th sample among driving information that is received from the neighboring vehicle i. $a_i(N)$ denotes acceleration at the N-th sample among the driving information that is received from the neighboring vehicle i, and $\Delta t$ denotes a time difference between a sample value that is based on the driving information that is received from the neighboring vehicle i and a speed sample value based on the radar.

$$r_i(N) = \frac{\sum_{n=1}^{N}(\Delta V_i(n) - \overline{\Delta V_i})(a_i(n) - \overline{a_i})}{\sqrt{\sum_{n=1}^{N}(\Delta V_i(n) - \overline{\Delta V_i})^2}\sqrt{\sum_{n=1}^{N}(a_i(n) - \overline{a_i})^2}} \quad \text{[Equation 2]}$$

$\overline{\Delta V_i}$ : Average value of $\Delta V_i$ with respect to $N$ samples $\overline{a_i}$ : Average value of $a_i$ with respect to $N$ samples Here, if r satisfies $-1 < r < 1$, and becomes closer to 1, the correlation becomes high, and thus the corresponding vehicle can be verified as the target vehicle.

If the existence/nonexistence of the target vehicle or potential vehicle of interest is determined by the target vehicle selection unit 335, such information may be transferred to the state management unit 331, the driving management unit 333, and/or the profile management unit 337 to be used to match the purposes of the respective functions.

The state management unit 331 may manage the state of the CACC system. The CACC system may be in an off state, a standby state, or an activation state in accordance with the state of the subject vehicle, and existence/nonexistence of the target vehicle and/or potential vehicle of interest.

Figure 4:
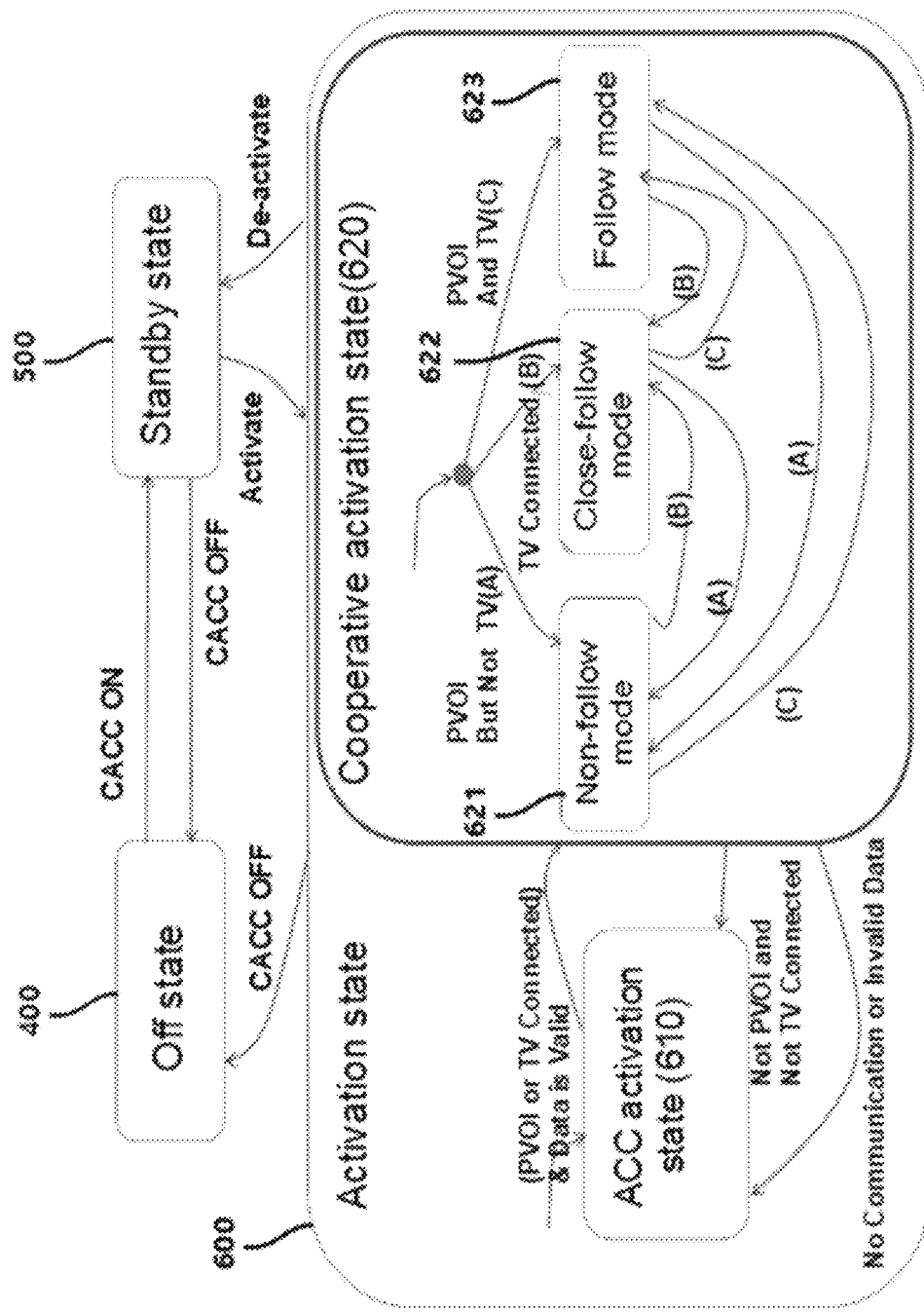
FIG. 4 is a diagram illustrating state transitions of a CACC system 300 according to an embodiment of the present disclosure.

FIG. 4 is a diagram illustrating state transitions of a CACC system according to an embodiment of the present disclosure.

Referring to FIG. 4, the CACC system may include an off state 400 in which the CACC system does not operate, a standby state 500 in which the CACC system operates, but does not control the driving speed of the subject vehicle, and an activation state 600 in which the driving speed of the subject vehicle is controlled. In particular, the activation state 600 may include an ACC activation state 610 in which the driving speed of the subject vehicle is controlled using only the information that is acquired from the subject vehicle in a state where there is no vehicle in the region of interest that is connected through the V2V communications, and a cooperative activation state 620 in which there is a neighboring vehicle in the region of interest that is connected through the V2V communications, and the driving speed of the subject vehicle is controlled using the information from the neighboring vehicle that is acquired through the V2V communications and the information that is acquired from the subject vehicle.

The off state 400 is a state in which the CACC system does not operate. That is, in the off state 400, the CACC system performs no function. The CACC system may be transitioned to the off state 400 through stalling of the subject vehicle or driver's manual operation.

The standby state 500 is a state in which the CACC system stands to be activated, and in the standby state 500, the CACC system does not perform the speed control. If the subject vehicle starts up, the CACC system may be transitioned to the standby state 500 after automatic completion of self-diagnosis in the off state 400, or may be transitioned from the off state 400 to the standby state 500 by the driver's manual operation. Further, the CACC system may be transitioned to the standby state 500 if a driver's manual control input, such as brake or throttle control, is received in the activation state 600.

The activation state 600 is a state in which the CACC system is activated to perform the speed control. As described above, the activation state 600 may include the ACC activation state 610 and the cooperative activation state 620. If there is not a potential vehicle of interest or a target vehicle that is connected through the V2V communications, the CACC system operates in the ACC activation state 610, whereas if there is a potential vehicle of interest or a target vehicle that is connected through the V2V communications, the CACC system operates in the cooperative activation state 620. The CACC system may be transitioned to the activation state 600 if the speed of the subject vehicle becomes higher than a predetermined speed (hereinafter referred to as a "first speed") in the standby state 500. Further, if the speed of the subject vehicle is lowered below the first speed in the activation state 600, the CACC system may forbid acceleration or may be transitioned to the standby state 500.

When the CACC system is transitioned to the activation state 600, it may first operate in the ACC activation state 610. In the ACC activation state 610, cruise control may be performed to match the highest speed that is set like the ACC system in the related art, or following control may be performed if a front vehicle exists. In the ACC activation state 610, if a potential vehicle of interest or a target vehicle that is connected through the V2V communications exists and data that is received from the potential vehicle of interest or the target vehicle is reasonable, the CACC system may be transitioned to the cooperative activation state 620. In an embodiment of the present disclosure, if information related to the potential vehicle of interest or the target vehicle that is received using the V2V communications coincides with the vehicle information that is acquired by the sensor of the subject vehicle through the information collection unit 310, it may be verified that the data is reasonable. Such verification may be performed by the target vehicle selection unit 335.

Further, if the potential vehicle of interest or the target vehicle does not exist in the cooperative activation state 620, the CACC system may be transitioned to the ACC activation state 610, and even if the V2V communications are not performed or only unreasonable data is received, the CACC system may be transitioned to the ACC activation state 610.

The cooperative activation state 620 of the CACC system may include a non-follow mode 621, a close-follow mode 622, and a follow mode 623. The non-follow mode 621 is a mode that is performed in the case where the potential vehicle of interest is connected through the V2V communications, but the target vehicle does not exist, and the speed control of the subject vehicle through the CACC system may be affected by data that is received from the potential vehicle of interest.

The close-follow mode 622 is a mode that is performed in the case where the target vehicle that is connected through the V2V communications exists, and in this case, the speed control of the subject vehicle through the CACC system may be affected by information that comes from the connected target vehicle and potential vehicle of interest.

The follow mode 623 is a mode that is performed in the case where the target vehicle exists, but is not connected through the V2V communications. In this case, the target vehicle may be sensed by the sensor of the subject vehicle, and such information may be acquired by the information collection unit 310. In this case, the speed control of the subject vehicle through the CACC system may be affected by information that comes from the connected potential vehicle of interest and the target vehicle that is sensed by the sensor.

The CACC system may operate in one of the above-described three kinds of modes in the cooperative activation state 620, and the three kinds of modes may be determined depending on whether the target vehicle exists and whether the target vehicle is connected through the V2V communications.

That is, referring to FIG. 4, if the target vehicle does not exist in the region of interest, but the potential vehicle of interest exists in the cooperative activation state 620, the CACC system may be transitioned (A) to the non-follow mode 621, and if the target vehicle that is connected through the V2V communications exists, the CACC system may be transitioned (B) to the close-follow mode. If the target vehicle that is not connected through the V2V communications exists in the region of interest and the potential vehicle of interest also exists in the region of interest, the CACC system may be transitioned (C) to the follow mode 623.

If neither the connected target vehicle nor the potential vehicle of interest exists, the CACC system may be transitioned to the ACC activation state 610.

Maximum and minimum requirements per mode that can be controlled in the activation state 600 of the CACC system may be defined as in Table 1 below.

TABLE 1

| Target vehicle existence | Target vehicle connection | PVOI existence | CACC mode | Minimum time gap | Maximum Deceleration | Maximum Acceleration | Whether to use data received through V2V communications |
|---|---|---|---|---|---|---|---|
| no | no | no | ACC activation state: Speed control mode | 0.8 s | 3.5 m/s^2 | 2.0 m/s^2 | Unused |
| yes | no | no | ACC activation state: Follow mode | 0.8 s | 3.5 m/s^2 | 2.0 m/s^2 | Unused |
| no | no | yes | Cooperative activation state: Non-follow mode | 0.8 s | 3.5 m/s^2 | 2.0 m/s^2 | Used |
| yes | yes | no | Cooperative activation state: Close-follow mode | 0.5 s | 5 m/s^2 | 2.75 m/s^2 | Used |
| yes | yes | yes | Cooperative activation state: Close-follow mode | 0.5 s | 5 m/s^2 | 2.75 m/s^2 | Used |
| yes | no | yes | Cooperative activation state: Follow mode | 0.8 s | 3.5 m/s^2 | 2.0 m/s^2 | Used |

Referring to Table 1, the CACC system is unable to set the minimum time gap to 0.5 s or less, is unable to perform deceleration control of 5 m/s^2 or more through control of maximum brake, and is unable to perform acceleration control of 2.75 m/s^2 or more through control of throttle.

Referring again to FIG. 3, the state management unit 331 may manage the state of the CACC system 300 according to the above-described method, and if the CACC system 300 is in an activation state, the driving management unit 333 may control the driving speed of the subject vehicle. In the case of the CACC system 300, the driving speed is generally controlled so that the driver can perform driving to match the set target speed. However, if the target vehicle exists, the driving speed may be controlled so that the subject vehicle can follow the target vehicle.

The driving management unit 333 may control the driving speed of the subject vehicle based on the state information of the state management unit 331 and existence/nonexistence of the target vehicle and/or the potential vehicle of interest from the target vehicle selection unit 335. In particular, in order to seek safer driving environments for a driver, the driving speed may be controlled using not only the target vehicle of the subject vehicle 700 but also driving information of the target vehicle.

Hereinafter, the driving control in consideration of the driving information of the target vehicle in the CACC system 300 will be described in more detail with reference to FIG. 5.

Figure 5:
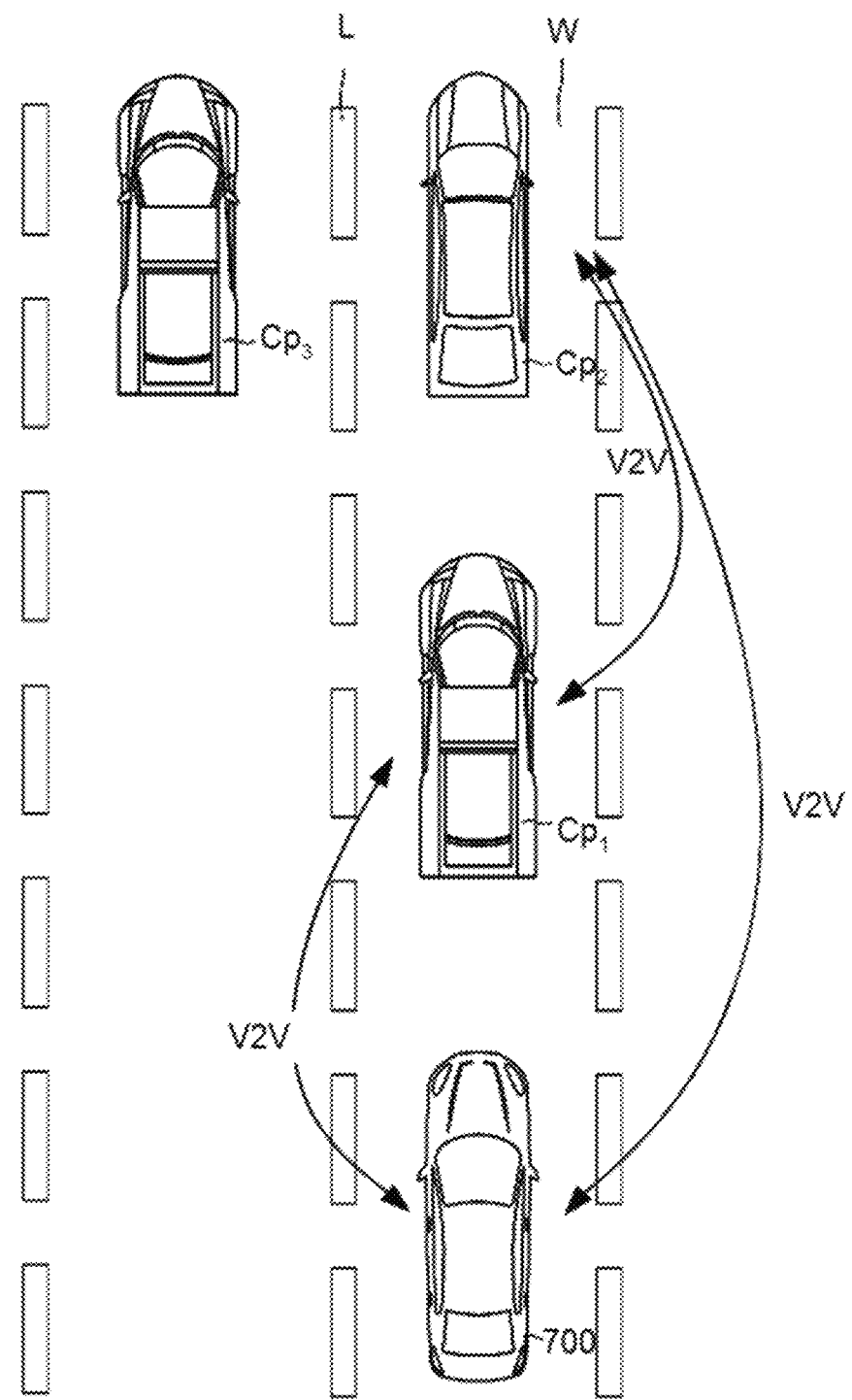
FIG. 5 is a diagram explaining a driving speed control process of a CACC system according to an embodiment of the present disclosure.

FIG. 5 is a diagram explaining a driving speed control process of a CACC system according to an embodiment of the present disclosure.

Referring to FIG. 5, a driving line in the same lane includes a front vehicle Cp2, a forward vehicle Cp1 that may be a target vehicle of a subject vehicle 700, and the subject vehicle 700 in order. Here, the front vehicle Cp2 may be a target vehicle of the forward vehicle Cp1. Here, since a vehicle Cp3 does not travel in the same lane as the lane of the subject vehicle 700, it may be a potential vehicle of interest, but may not be the target vehicle.

The vehicles 700, Cp1, Cp2, and Cp3 may send/receive their driving information through V2V communications. In particular, the respective vehicles may transmit identifiers (IDs) of their target vehicles together when transmitting their own driving information. That is, since the vehicle Cp2 has no target vehicle that travels in front thereof, it transmits only its own driving information, and if the vehicle Cp2 becomes the target vehicle of the vehicle Cp1, the vehicle Cp1 may transmit the ID (e.g., ID-2) of its target vehicle together with its own driving information. Accordingly, the subject vehicle 700 may receive ID information (e.g., ID-2) of the vehicle Cp2 that is the target vehicle of the vehicle Cp1 together with the driving information of the vehicle Cp1 that is the target vehicle of the subject vehicle 700. In this case, the driving management unit 333 of the CACC system 300 that is mounted on the subject vehicle 700 may be aware of the target vehicle Cp2 of the target vehicle Cp1 using the received ID information, and may control the driving speed of the subject vehicle 700 using the driving information that is received from the vehicle Cp1 and the driving information that is received from the vehicle Cp2.

More specifically, for accurate selection of the target vehicle, the target vehicle selection unit 335 may use both data which comes from the neighboring vehicle and is received by the communication unit 320 and forward vehicle information that is collected by the information collection unit 310. That is, the target vehicle selection unit 335 can select the target vehicle only in the case where two kinds of information coincide with each other or the above-described verification condition is satisfied. In particular, in the case of controlling the speed based on not only the driving information of the target vehicle but also the driving information of the target vehicle of the target vehicle, the target vehicle of the target vehicle should be accurately confirmed.

Hereinafter, a method for verifying the target vehicle of the subject vehicle (first target vehicle) and the target vehicle of the target vehicle (second target vehicle) will be described in more detail. Since neighboring vehicle information that is received through the communication unit 320 among information that is required in the target vehicle selection unit 335 can be immediately acquired through V2V communications, collection of information of the forward vehicle that may be the first target vehicle and the far-forward vehicle that may be the second target vehicle, which is performed by the information collection unit 310, will be described in more detail.

The information collection unit 310 may use a camera and/or a distance sensor 311 to collect the information of the forward vehicle and the far-forward vehicle.

The camera may acquire a front image in order to determine a driving lane W of the subject vehicle 700. The front image that is acquired by the camera may include a lane Win which the subject vehicle travels and a line L that forms the lane. The camera may be installed on a front portion of the vehicle, and may include an image sensor, such as a charge coupled device (CCD) or a complementary MOS (CMOS).

The distance sensor 311 may sense objects that are positioned in front of the subject vehicle 700, for example, the forward vehicle Cp1 and the far-forward vehicle Cp2 that travel in front of the subject vehicle 700, stopped objects including structures installed around the road, and vehicles that come in an opposite lane. Further, the distance sensor 311 may sense a distance from an object that is in front of the subject vehicle 700, and may also sense the speed and acceleration in the case of a moving object.

For this, the distance sensor 311 may be implemented by radar or light detection and ranging (lidar). If the distance sensor 311 is implemented by the lidar, it may irradiate a predetermined front area with laser, and may receive the laser that is reflected from the front object. After receiving the laser, the distance sensor 311 may sense physical properties of the front object, such as a distance, speed, and shape of the front object, from laser reception time and strength, frequency change, and polarizing state change. Hereinafter, for convenience in explanation, it is assumed that the distance sensor 311 is implemented by the lidar.

Figure 6A:
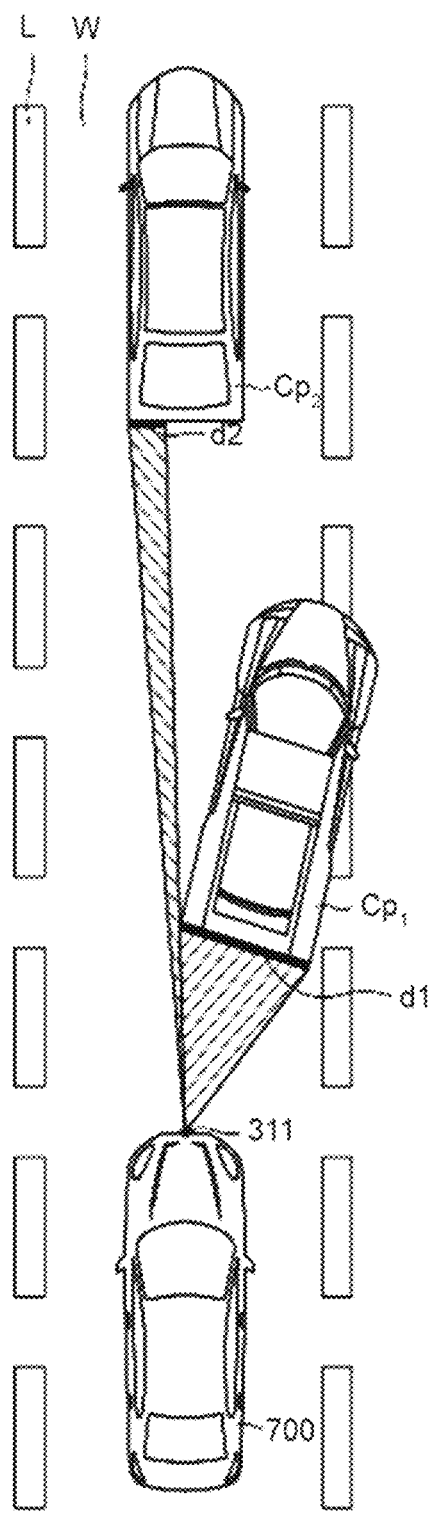
FIGS. 6A and 6B are diagrams explaining sensing results of a forward vehicle Cp1 and a far-forward vehicle Cp2 according to the position of the forward vehicle Cp1.
Figure 6B:
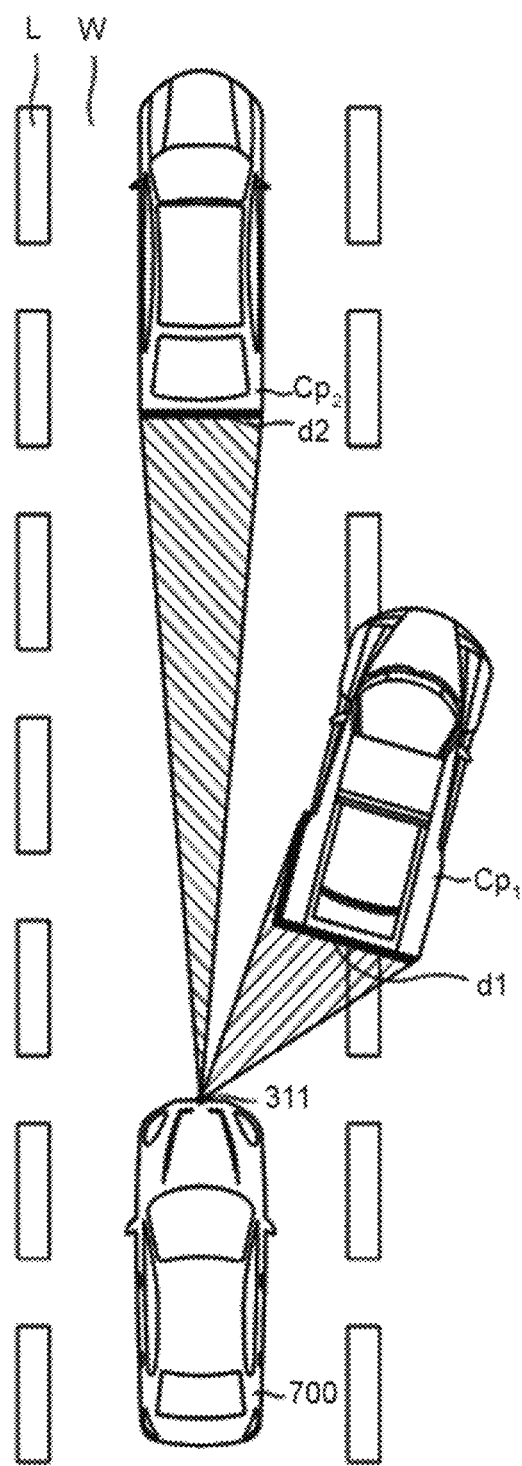

FIGS. 6A and 6B are diagrams explaining sensing results of a forward vehicle Cp1 and a far-forward vehicle Cp2 according to the position of the forward vehicle Cp1. In FIGS. 6A and 6B, shaded areas are areas which the distance sensor 311 irradiates with laser.

If the forward vehicle Cp1 and the far-forward vehicle Cp2 exist in the driving lane W as shown in FIG. 5, the distance sensor 311 of the subject vehicle 700 may sense the forward vehicle Cp1 through irradiation of laser in the front. If the forward vehicle Cp1 travels in the same direction as the driving direction of the subject vehicle 700, the distance sensor 311 may sense the rear portion of the forward vehicle Cp1. Further, if the forward vehicle CP1 is positioned in the traveling path of the irradiated laser, the distance sensor 311 may not sense the far-forward vehicle Cp2 that is hidden by the forward vehicle Cp1.

On the other hand, the forward vehicle Cp1 may secede from the driving lane W in order to change the lane. Referring to FIG. 6A, d1 denotes a rear area of the forward vehicle Cp1 that is sensed by the distance sensor 311, and d2 denotes a rear area of the far-forward vehicle Cp2 that is sensed by the distance sensor 311.

Here, d2 may be changed according to the position of the forward vehicle Cp1. FIG. 6B exemplifies a case where the forward vehicle Cp1 has further moved to the right in comparison to a case as exemplified in FIG. 6A. In this case, it can be confirmed that the rear area of the far-forward vehicle Cp2 that is sensed by the distance sensor 311 is different from that as illustrated in FIG. 6A.

The sensing result of the distance sensor 311 may be used for the target vehicle selection unit 335 to determine the existence of the first target vehicle Cp1 and the far-forward vehicle Cp2.

The target vehicle selection unit 335 may determine the existence of the forward vehicle Cp1 and the far-forward vehicle Cp2 that travel in the same lane as the driving lane W based on the sensing result of the distance sensor 311. As described above, since the forward vehicle Cp1 and the far-forward vehicle Cp2 should travel in the same lane as the driving lane W, the target vehicle selection unit 335 may first determine the driving lane W.

For this, the target vehicle selection unit 335 may use the front image that is acquired by the camera 200. The target vehicle selection unit 335 may process the front image so that the line L is clearly shown in the front image. Through this, the target vehicle selection unit 335 may extract left and right lines L that is most adjacent to the center of the front image, and may determine the lane that is formed by the lines as the driving lane W.

If the driving lane W is determined, the target vehicle selection unit 335 may determine whether the object that is positioned in the driving lane W among front objects that are sensed by the distance sensor 311 is the forward vehicle Cp1 or the far-forward vehicle Cp2. Specifically, the target vehicle selection unit 335 may first determine the existence of the forward vehicle Cp1, and then may determine the existence of the far-forward vehicle Cp2 using the position of the determined forward vehicle Cp1.

In order to determine the forward vehicle Cp1, the target vehicle selection unit 335 may use a predetermined first reference width. Here, the first reference width may mean the minimum width that can be determined as the forward vehicle Cp1 among the objects sensed by the distance sensor 311. The first reference width may be pre-stored in a storage unit to be described later, or may be predetermined by user's input or an operation of the target vehicle selection unit.

If the forward vehicle Cp1 travels in the same direction as the driving direction of the subject vehicle 700, or the driving direction of the forward vehicle Cp1 does not greatly secede from the driving direction of the subject vehicle 700, the distance sensor 311 may sense the rear portion of the forward vehicle Cp2. Referring to FIG. 6A, the distance sensor 311 may sense the rear area d1 of the forward vehicle Cp1, and d1 may be indicated in the form of a straight line. In this case, d1 may mean the width of the forward vehicle Cp1.

Unlike this, if the forward vehicle Cp1 greatly secedes from the driving direction of the subject vehicle 700, the distance sensor 311 may sense the rear portion and a part of the side portion of the forward vehicle Cp1. Referring to FIG. 6B, the distance sensor 311 may sense the rear area and the partial side area d1 of the forward vehicle Cp1, and d1 may be indicated in an "L" shape. In this case, the length of one of two straight lines that forms the "L"-shaped d1 may mean the width of the forward vehicle Cp1.

Accordingly, the target vehicle selection unit 335 may determine the existence of the forward vehicle Cp1 through confirming whether the width of the detected object in the driving lane W is equal to or larger than the first reference width. Specifically, the target vehicle selection unit 335 may confirm whether the width of the detected object is equal to or larger than the first reference width in the order that is most adjacent to the front. As a result, the target vehicle selection unit 335 may determine the object which is most adjacent to the front and has the width that is equal to or larger than the first reference width as the forward vehicle Cp1.

If the forward vehicle Cp1 is determined, the target vehicle selection unit 335 may determine the far-forward vehicle Cp2 based on the position of the forward vehicle Cp1. As described above with reference to FIGS. 6A and 6B, the sensed area d2 of the far-forward vehicle Cp2 is changed according to the position of the forward vehicle Cp1, and thus the target vehicle selection unit 335 may determine the far-forward vehicle Cp2 according to the position of the determined forward vehicle Cp1.

Specifically, the target vehicle selection unit 335 may determine the object that has a width that is equal to or larger than the second reference width that is determined according to the position of the forward vehicle Cp1 as the far-forward vehicle Cp2. For this, the target vehicle selection unit 335 may first determine the second reference width using the position of the forward vehicle Cp1.

Figure 7:
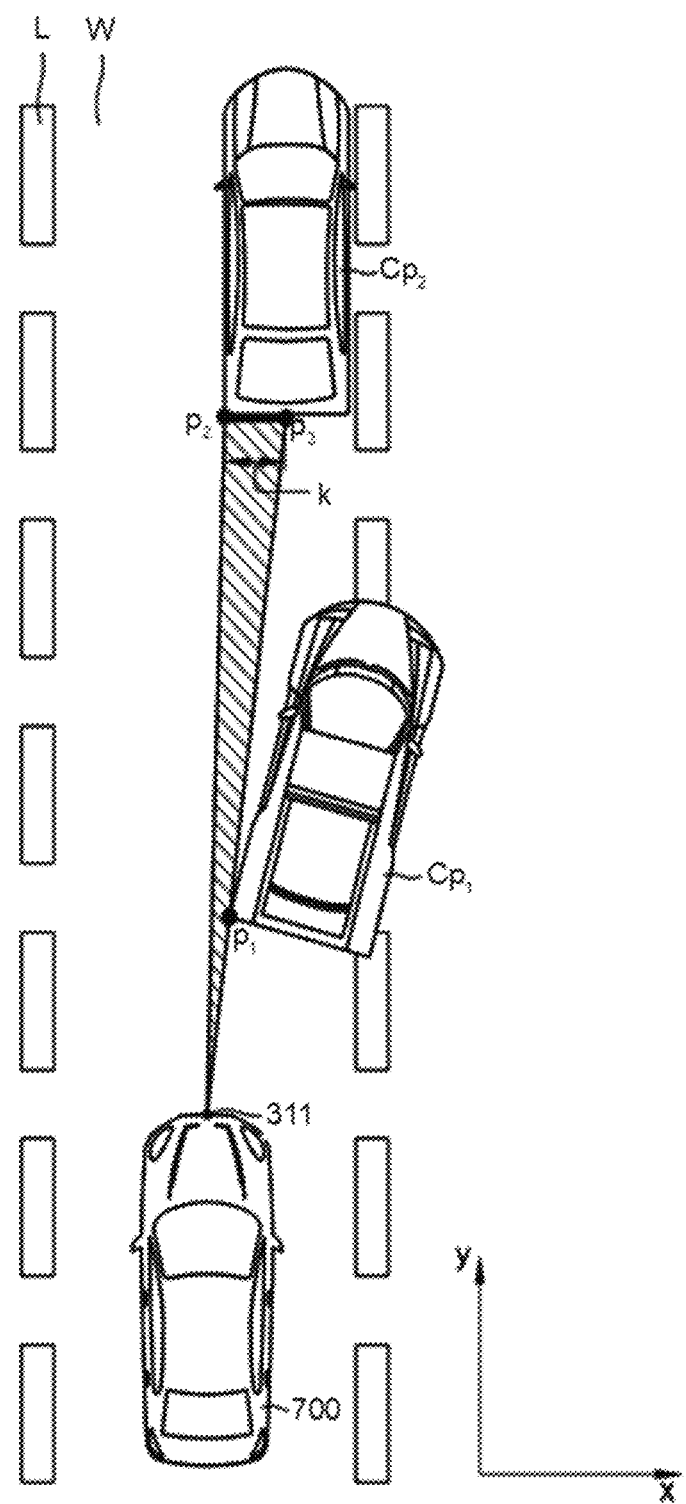
FIG. 7 is a diagram exemplifying a case where a forward vehicle Cp1 is changing its lane to the right lane.

FIG. 7 is a diagram exemplifying a case where a forward vehicle Cp1 is changing its lane to the right lane. Referring to FIG. 7, a method for determining a second reference width will be described. In FIG. 7, it is assumed that the position of the distance sensor 311 that irradiates with laser is the original point.

First, the target vehicle selection unit 335 acquires left rear corner coordinates P1(preV_x, preV_y) of the forward vehicle Cp1. As illustrated in FIG. 6A, if it is sensed that the sensed area d1 of the forward vehicle Cp1 is a straight line, the target vehicle selection unit 335 may set the left end of the straight line d1 as P1. Unlike this, if it is sensed that the sensed area d1 of the forward vehicle Cp1 is in "L" shape, the target vehicle selection unit 335 may set the vertex of d1 as P1.

Next, the target vehicle selection unit 335 acquires left rear corner coordinates P2(pre_preV_x, pre_preV_y) of the far-forward vehicle Cp2 on the assumption that the far-forward vehicle Cp2 is positioned on the rightmost in the driving lane W of the far-forward vehicle Cp2.

After acquiring P1 and P2, the target vehicle selection unit 335 may acquire an intersection P3(intersect_x, intersect_y) between a straight line passing from the original point to P1 and X=pre_preV_x.

Last, the target vehicle selection unit 335 may determine the distance between P2 and P3 as the second reference width k. Specifically, the target vehicle selection unit 335 may acquire the second reference width k according to Equation 3 below.

$$k = \text{abs}(\text{intersect\_x} - \text{pre\_preV\_x}) \qquad [\text{Equation 3}]$$

Here, k denotes the second reference width, intersect_x denotes x-coordinate of P3, and pre_preV_x denotes x-coordinate of P2.

Up to now, description has been made on the assumption that the forward vehicle CP1 changes its lane to the right side. However, even in the case where the forward vehicle Cp1 changes its lane to the left side, the second reference width may be acquired in a similar manner.

After acquiring the second reference width, the target vehicle selection unit 335 may determine an object having a width that is equal to or larger than the second reference width among objects that are sensed in the driving lane W as the far-forward vehicle Cp2. In an embodiment, the target vehicle selection unit 335 of the subject vehicle 700 may determine the object having the width that is equal to or larger than the second reference width at a time as the far-forward vehicle Cp2.

Further, in another embodiment, the target vehicle selection unit 335 of the subject vehicle 700 may determine an object having the width that is equal to or larger than the second reference width for a predetermined reference time as the far-forward vehicle Cp2. Through this, determination accuracy for the far-forward vehicle Cp2 can be heightened.

In particular, the target vehicle selection unit 335 may determine, as the far-forward vehicle Cp2, an object which has the width that is equal to or larger than the second reference width for a predetermined reference time and of which the sensed width is increased. As illustrated in FIGS. 6A and 6B, as the lane change of the forward vehicle Cp1 proceeds, the sensed area d2 of the far-forward vehicle Cp2 may be increased. Accordingly, considering whether the width is increased, the target vehicle selection unit 335 may determine the existence of the far-forward vehicle Cp2 more easily when the forward vehicle Cp1 secedes from the driving lane W.

Further, the target vehicle selection unit 335 may determine an object that is closest to the determined forward vehicle Cp1 as the far-forward vehicle Cp2 if a plurality of objects having the widths that are equal to or larger than the second reference width are sensed. As described above, since the far-forward vehicle Cp2 should become the target vehicle of the forward vehicle CP1, the target vehicle selection unit 335 may determine the object that is positioned just in front of the forward vehicle Cp1 among the objects having the widths that are equal to or larger than the second reference width as the far-forward vehicle CP2.

If the forward vehicle Cp1 and the far-forward vehicle Cp2 are determined, the target vehicle selection unit 335 may determine the forward vehicle Cp1 and the far-forward vehicle Cp2 as the first target vehicle and the second target vehicle if they have passed the above-described verification using the neighboring vehicle information that is acquired through the communication unit 320 and information of the forward vehicle Cp1 and the far-forward vehicle Cp2 that is collected using sensors of the subject vehicle 700 as described above, and thus the selection reliability can be heightened.

If the first target vehicle Cp1 and the second target vehicle Cp2 are selected by the target vehicle selection unit 335, the driving management unit 333 may control the driving unit to perform driving at the driving speed that is determined according to the driving information of the first target vehicle Cp1 and the second target vehicle Cp2. Here, the driving information may include all kinds of information related to the driving, such as speed, acceleration, and position.

For this, the driving management unit 333 may acquire a first driving speed that corresponds to the driving information of the first target vehicle Cp1 and a second driving speed that corresponds to the driving information of the second target vehicle Cp2 through the information collection unit 310 and/or the communication unit 320. Specifically, the driving management unit 333 may acquire the first driving speed that can maintain a first safety distance from the first target vehicle CP1, and may acquire the second driving speed that can maintain a second safety distance from the second target vehicle CP2.

Last, the driving management unit 333 may control the driving unit to perform driving according to any one of the first driving speed and the second driving speed. Specifically, the driving management unit 333 may control the driving unit to perform driving according to one of the first driving speed and the second driving speed that has a smaller value than the value of the other.

Through this, the CACC system 300 according to the disclosed embodiment may control the subject vehicle 700 to travel through maintaining the safety distance in relation to the second target vehicle Cp2 even if the first target vehicle Cp1 secedes from the lane.

On the other hand, the driving management unit 333 may control the driving unit to perform driving at a driving speed that is determined according to the driving information of the first target vehicle Cp1 and the second target vehicle Cp2 only in the case where the first target vehicle Cp1 secedes from the driving lane W. In order to determine whether the first target vehicle Cp1 secedes from the driving lane W, the driving management unit 333 may use the speed and the position of the first target vehicle Cp1. Specifically, the driving management unit 333 may determine whether the first target vehicle Cp1 secedes from the lane using the speed and the position of the first target vehicle Cp1 with respect to the line L that forms the driving lane W that is acquired through the front image.

Through this, the subject vehicle 700 according to the disclosed embodiment may determine the driving speed that is adaptive to whether the first target vehicle Cp1 secedes from the lane.

Up to now, description has been made on the assumption that the driving lane W has a straight line or a curvature that is similar to the straight line. Unlike this, even in the case where the driving lane W has a large curvature, the target vehicle selection unit 335 may select the first target vehicle and the second target vehicle through sensing of the forward vehicle and the far-forward vehicle in a similar manner.

Figure 8:
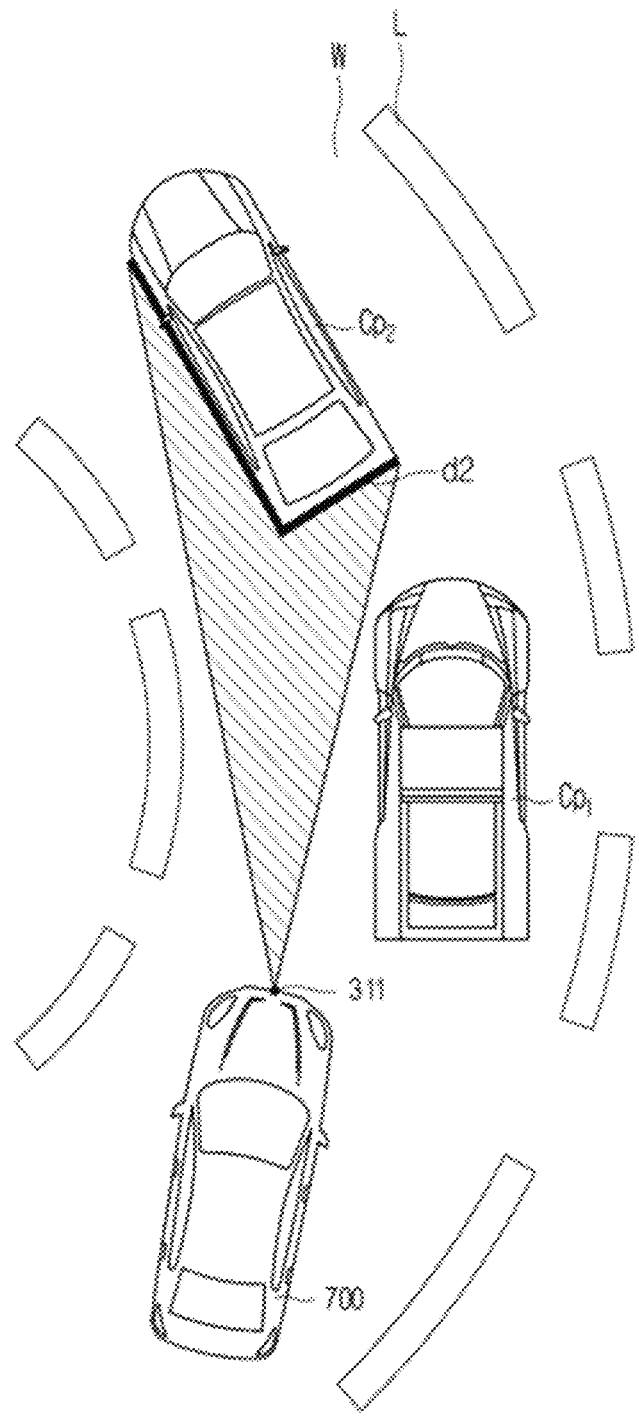
FIG. 8 is a diagram explaining the sensing results of a forward vehicle and a far-forward vehicle according to the position of the forward vehicle on a curved driving lane.

FIG. 8 is a diagram explaining the sensing results of a forward vehicle and a far-forward vehicle according to the position of the forward vehicle on a curved driving lane.

In comparison to the straight driving lane W, the subject vehicle 700 that travels in a curved driving lane W may have higher danger of an accident. Accordingly, during traveling in the curved driving lane W, it is needed for the subject vehicle 700 to determine the driving speed in consideration of not only the driving speed of the forward vehicle Cp1 but also the driving speed of the far-forward vehicle Cp2.

If the driving lane W is determined, the target vehicle selection unit 335 may determine whether the curvature of the driving lane W is equal to or larger than a predetermined reference curvature. Here, the predetermined reference curvature may mean the minimum curvature that the curved driving lane W has.

If the curvature of the driving lane W is equal to or larger than the predetermined reference curvature, the target vehicle selection unit 335 may determine the far-forward vehicle Cp2 through a method that corresponds to the curved driving lane W. After determining the forward vehicle Cp1 according to the method as described above with reference to FIGS. 6A, 6B, and 7, the target vehicle selection unit 335 may determine an object of which plural surfaces are sensed by the distance sensor among objects having the widths that are equal to or larger than the second reference width as the far-forward vehicle Cp2.

Referring to FIG. 8, in the case of traveling in the curved driving lane W, the sensed area d2 of the far-forward vehicle Cp2 through the distance sensor may be formed in "L" shape. In other words, the distance sensor may sense both the rear portion and one side portion of the second target vehicle Cp2 in the curved driving lane W.

Through the above-described method, the target vehicle selection unit 335 may sense the forward vehicle Cp1 and the far-forward vehicle Cp2, and if the first target vehicle and the second target vehicle are selected based on the sensed vehicles, the driving management unit 333 may determine the driving speed through the above-described method.

Like this, through consideration of the curvature of the driving lane W, the subject vehicle according to the disclosed embodiment can determine the driving speed for securing the safety distance even in the case of traveling in the curved lane.

Referring again to FIG. 3, information that is used to control the subject vehicle 700 may be pre-stored in the storage unit (not illustrated). For example, the first reference width that is used to determine the forward vehicle Cp1 may be pre-stored in the storage unit. Further, an algorithm for obtaining the second reference width that is used to determine the far-forward vehicle Cp2 may be pre-stored in the storage unit. Further, a reference curvature that is used to determine the curved driving lane W or the above-described reference time may be pre-stored in the storage unit.

Figure 9:
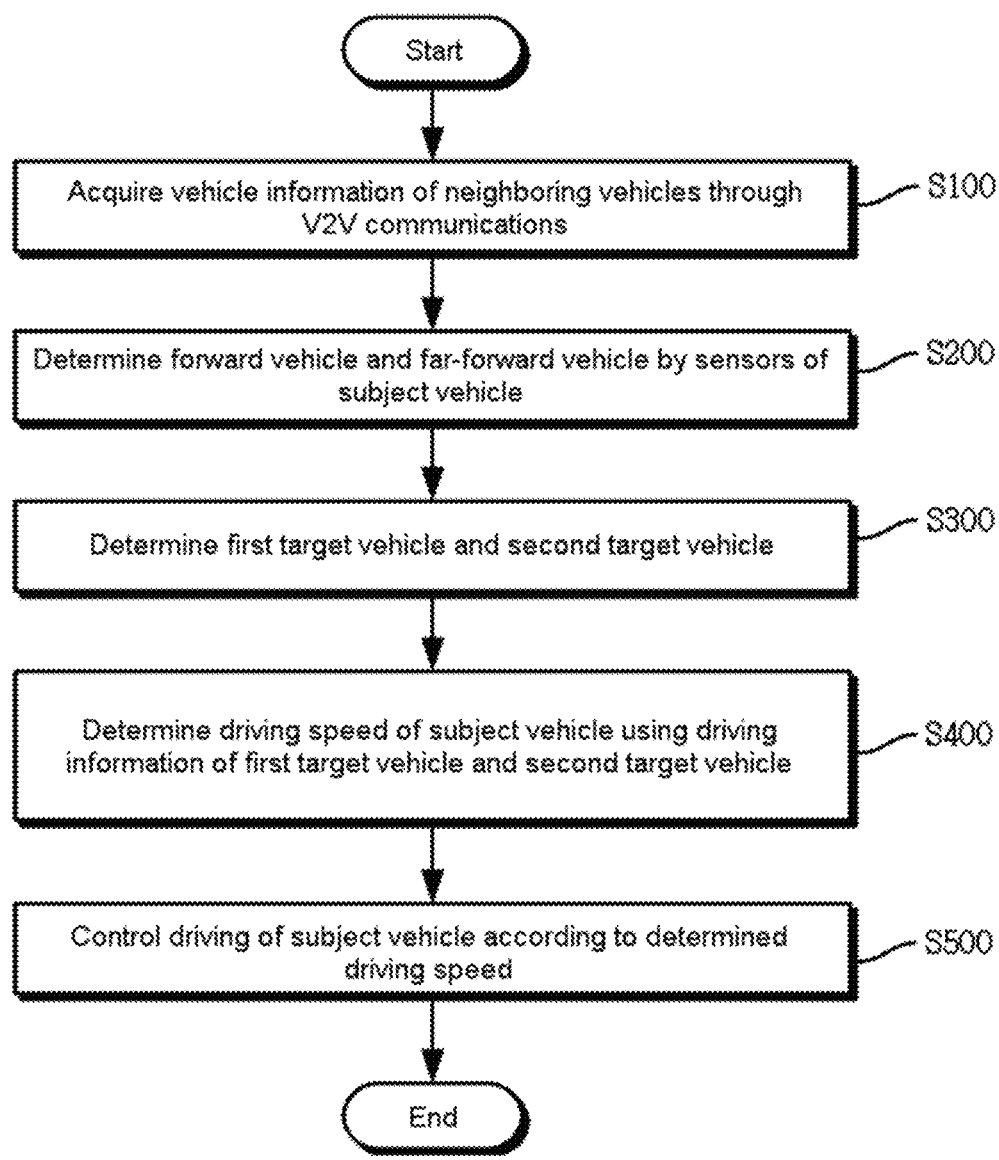
FIG. 9 is a flowchart explaining a case where a CACC system controls the driving speed of a subject vehicle according to an embodiment of the present disclosure.

FIG. 9 is a flowchart explaining a case where a CACC system 300 controls the driving speed of a subject vehicle according to an embodiment of the present disclosure.

Referring to FIG. 9, the CACC system 300 may acquire vehicle information of neighboring vehicles using V2V communications (S100). The vehicle information may include information, such as GPS position information, speed, and acceleration, and may further include information on a road in which the respective neighboring vehicles travel.

Further, the CACC system 300 may determine a forward vehicle and a far-forward vehicle that travel in front of a subject vehicle 700 using a camera or a distance sensor that is attached to the subject vehicle 700 (S200). Further, the CACC system may determine a first target vehicle and a second target vehicle through comparison of neighboring vehicle information that is acquired through the V2V communications with the forward vehicle and the far-forward vehicle that are determined using sensors of the subject vehicle (S300). Here, the first target vehicle may be a target vehicle that is followed by the subject vehicle 700, and the second target vehicle may be a target vehicle that is followed by the first target vehicle. After determining the first target vehicle and the second target vehicle as described above, the CACC system 300 may determine the driving speed of the subject vehicle using driving information of the first target vehicle and the second target vehicle (S400), and may control the driving of the subject vehicle according to the determined driving speed (S500). Here, the driving information may be all kinds of information related to the first target vehicle and the second target vehicle that includes a speed, acceleration, and position.

The CACC system 300 according to the disclosed embodiment may secure safety in consideration of both the first target vehicle Cp1 and the second target vehicle Cp2.

Figure 10:
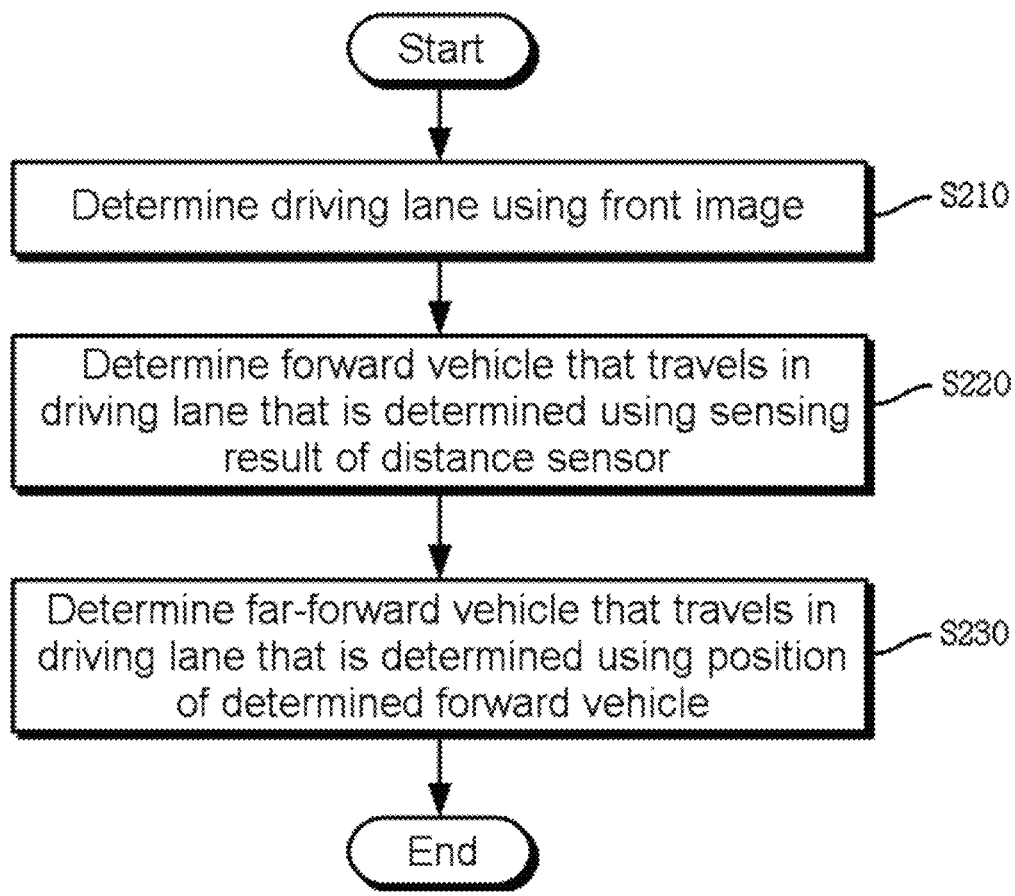
FIG. 10 is a flowchart explaining a case where a CACC system determines a forward vehicle and a far-forward vehicle using sensors of a subject vehicle according to an embodiment of the present disclosure.

FIG. 10 is a flowchart explaining a case where a CACC system 300 determines a forward vehicle and a far-forward vehicle using sensors of a subject vehicle according to an embodiment of the present disclosure.

The CACC system 300 may first determine the driving lane W using a front image (S210). Specifically, the CACC system 300 may acquire the front image that includes lane information using a camera through the information collection unit 310, and may determine the driving lane W through extraction of the lane through image processing.

If the driving lane W is determined, the CACC system 300 may determine a forward vehicle that travels in the driving lane W using the sensing result of a distance sensor 311 (S220). For this, the CACC system 300 may determine an object having a width that is equal to or larger than a predetermined first reference width among objects in the driving lane W that are sensed by the distance sensor 311 as the forward vehicle Cp1.

Next, the CACC system 300 may determine a far-forward vehicle Cp2 that travels in the driving lane W using the position of the determined forward vehicle Cp1. For this, the CACC system 300 may acquire a second reference width that corresponds to the position of the forward vehicle Cp1. After acquiring the second reference width, the CACC system 300 may determine an object having a width that is equal to or larger than the second reference width among objects in the driving lane W that are sensed by the distance sensor 311 as the far-forward vehicle Cp2.

The CACC system 300 may determine a first target vehicle and a second target vehicle through comparison of the forward vehicle Cp1 and the far-forward vehicle Cp2 determined as described above with information of neighboring vehicles that is acquired through a communication unit 320 (S300).

Hereinafter, a method for controlling a CACC system 300 will be described in detail in the case where the driving lane W is in the form of a straight line and a curve, respectively.

Figure 11:
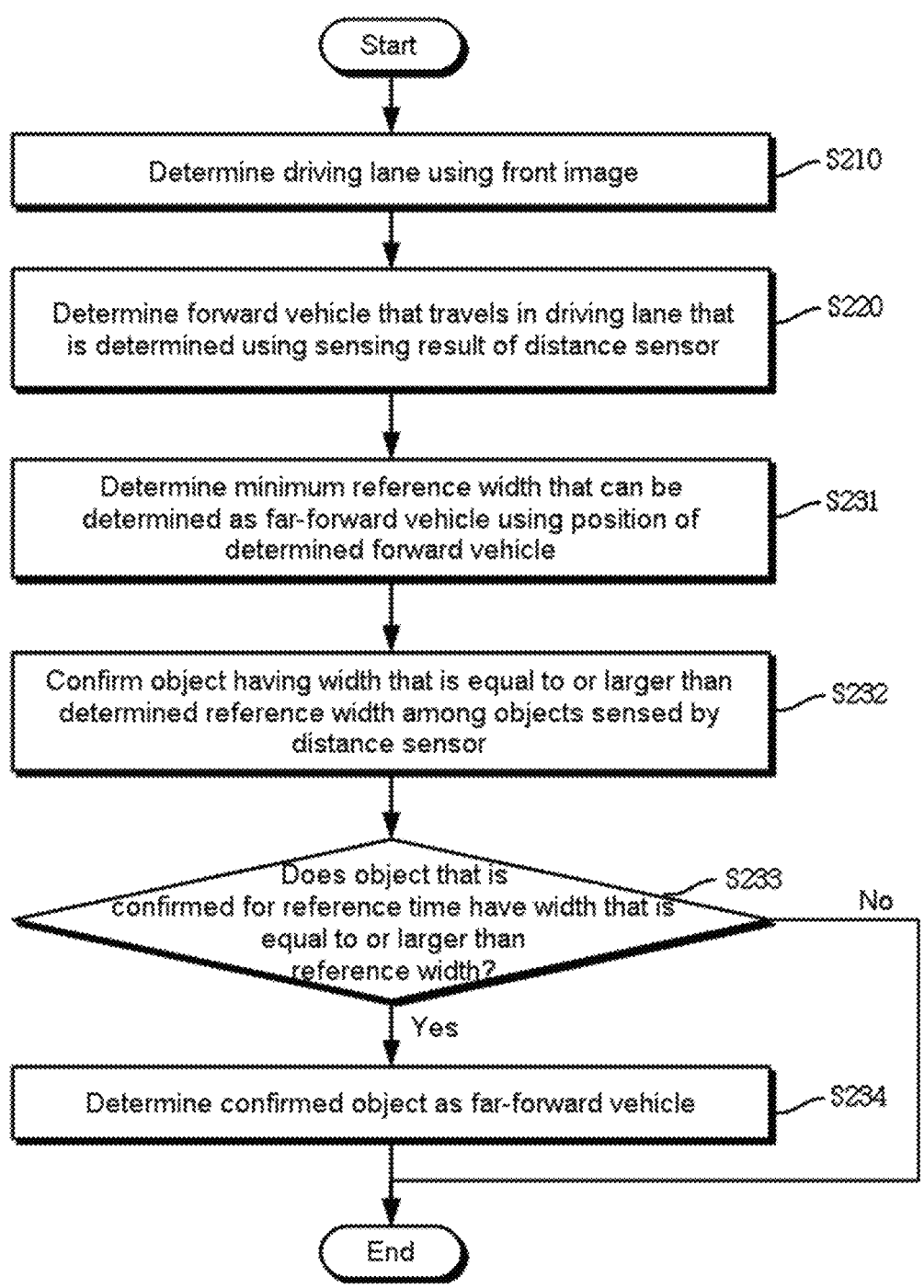
FIG. 11 is a flowchart explaining a case where a CACC system determines a forward vehicle and a far-forward vehicle using sensors of a subject vehicle on a straight driving lane according to an embodiment of the present disclosure.

FIG. 11 is a flowchart explaining a case where a CACC system 300 determines a forward vehicle and a far-forward vehicle using sensors of a subject vehicle on a straight driving lane according to an embodiment of the present disclosure.

Referring to FIG. 11, the CACC system 300 may determine the driving lane W using the front image (S210). Specifically, the CACC system 300 may acquire the front image that includes lane information using a camera, and may determine the driving lane W through extraction of the lane through image processing.

If the driving lane W is determined, the CACC system 300 may determine a forward vehicle Cp1 that travels in the driving lane W using the sensing result of a distance sensor 311 (S220). For this, the CACC system 300 may determine an object having a width that is equal to or larger than a predetermined first reference width among objects in the driving lane W that are sensed by the distance sensor 311 as the forward vehicle Cp1.

The CACC system 300 may determine the minimum reference width that can be determined as a far-forward vehicle Cp2, that is, a second reference width, using the position of the forward vehicle Cp1 (S231). As described above with reference to FIG. 7, the CACC system 300 may confirm positions P1, P2, and P3 in consideration of the position of the distance sensor 311 as the original point, and may confirm a second reference width according to Equation 1.

If the second reference width is confirmed, the CACC system 300 may confirm an object having a width that is equal to or larger than the reference width among objects that are sensed by the distance sensor 311 (S232). Further, the CACC system 300 may confirm whether the object that is confirmed for a reference time has a width that is equal to or larger than the second reference width (S233).

If the object that is confirmed for the reference time does not have the width that is equal to or larger than the second reference width, the CACC system 300 does not determine the confirmed object as the far-forward vehicle to perform an end operation.

In contrast, if the object that is confirmed for the reference time has the width that is equal to or larger than the second reference width, the CACC system 300 may determine the confirmed object as the far-forward vehicle Cp2 (S2324).

Figure 12:
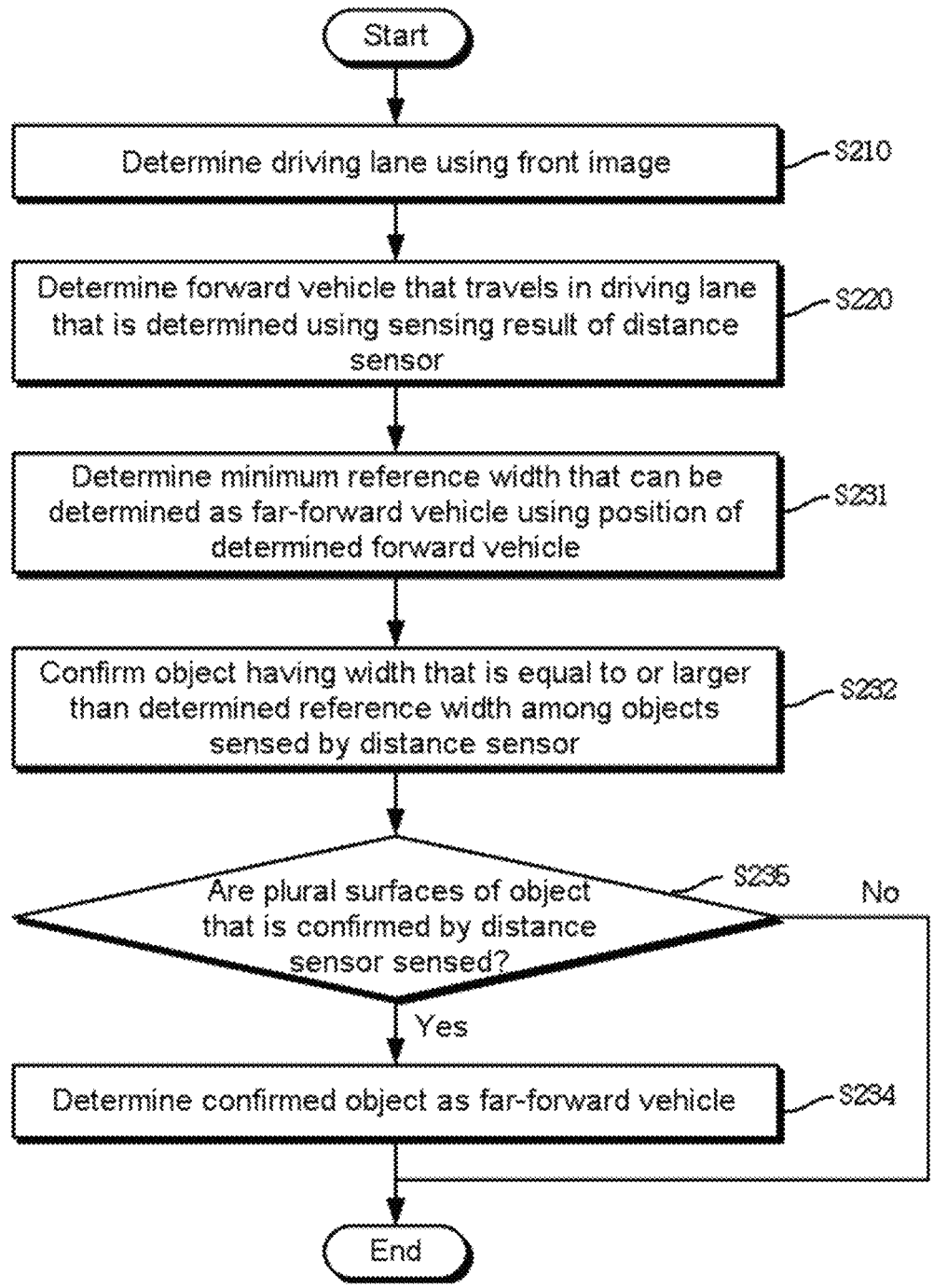
FIG. 12 is a flowchart explaining a case where a CACC system determines a forward vehicle and a far-forward vehicle using sensors of a subject vehicle on a curved driving lane according to an embodiment of the present disclosure.

FIG. 12 is a flowchart explaining a case where a CACC system 300 determines a forward vehicle and a far-forward vehicle using sensors of a subject vehicle on a curved driving lane according to an embodiment of the present disclosure.

Referring to FIG. 12, the CACC system 300 may determine the driving lane W using the front image (S210). Specifically, the CACC system 300 may acquire the front image that includes lane information using a camera, and may determine the driving lane W through extraction of the lane through image processing.

If the driving lane W is determined, the CACC system 300 may determine a forward vehicle Cp1 that travels in the driving lane W using the sensing result of a distance sensor 311 (S220). For this, the CACC system 300 may determine an object having a width that is equal to or larger than a predetermined first reference width among objects in the driving lane W that are sensed by the distance sensor 311 as the forward vehicle Cp1.

The CACC system 300 may determine the minimum reference width that can be determined as a far-forward vehicle Cp2, that is, a second reference width, using the position of the determined forward vehicle Cp1 (S231). As described above with reference to FIG. 7, the CACC system 300 may confirm positions P1, P2, and P3 in consideration of the position of the distance sensor 311 as the original point, and may confirm a second reference width according to Equation 1.

If the second reference width is confirmed, the CACC system 300 may confirm an object having a width that is equal to or larger than the reference width among objects that are sensed by the distance sensor 311 (S232). Further, the CACC system 300 may confirm whether a plurality of surfaces of the confirmed object are sensed by the distance sensor 311 (S235).

If the plurality of surfaces of the confirmed object are not sensed, the CACC system 300 does not determine the confirmed object as the far-forward vehicle to perform an end operation.

In contrast, if the plurality of surfaces of the confirmed object are not sensed, the CACC system 300 may determine the confirmed object as the far-forward vehicle Cp2 (S2324).

As described above, the CACC system proposed according to the present disclosure controls the speed in consideration of not only the first target vehicle but also the second target vehicle that is the target vehicle of the first target vehicle, and thus safe driving environments can be provided to the driver.

On the other hand, it should be understood that the CACC is exemplified in the specification for convenience in explanation. The CACC is merely one of various ADAS functions, and the CACC implementation that is proposed according to the present disclosure may also be used to implement other related ADAS functions. For example, the proposed method according to the present disclosure may be used even to implement one or a combination of ADAS functions, such as CACC, ACC (Adaptive Cruise Control), LCDAS (Lane Change Decision Aid System), LDWS (Lane Departure Warning System), LKAS (Lane Keeping Assistance System), RBDPS (Road Boundary Departure Prevention System), PDCMS (Pedestrian Detection and Collision Mitigation System), CSWS (Curve Speed Warning System), FVCWS (Forward Vehicle Collision Warning System), and LSF (Low Speed Following).

In one or more exemplary embodiments, explained functions may be implemented by hardware, software, firmware, or a certain combination thereof. In the case of implementation by software, these functions may be stored or transmitted as one or more instructions or codes on a computer readable medium. The computer readable medium includes both a communication medium and a computer storage medium which include a certain medium that facilitates transfer of computer programs from one place to another place. The storage medium may be a certain usable medium that can be accessed by a computer. As an example that is not limitation, such a computer readable medium may include a RAM, ROM, EEPROM, CD-ROM or another optical disk storage, magnetic disc storage or another magnetic storage device, or another medium that can be accessed by a computer, and may be used to transfer or store desired program codes in the form of instructions or data structures. Further, a certain connection may be properly called a computer readable medium. For example, if software is transmitted from a web site, a server, or another remote source using a coaxial cable, optical fiber cable, twisted dual lines, digital subscriber line (DSL), or wireless technology, such as infrared, radio, or ultrahigh frequency, the coaxial cable, optical fiber cable, twisted dual lines, DSL, or wireless technology, such as infrared, radio, or ultrahigh frequency is included in definition of the medium. The disk and disc, as used herein, include a compact disc (CD), laser disc, optical disc, digital versatile disc (DVD), floppy disk, and blu-ray disc. In general, the disk magnetically reproduces data, whereas the disc optically reproduces data by laser. The above-described combinations should also be included in the range of the computer readable medium.

In the case where the embodiments are implemented by program codes or code segments, it should be recognized that the code segment can indicate procedures, functions, subprograms, programs, routines, subroutines, modules, software packages, classes, or instructions, data structures, or a certain combination of program commands. The code segment may be connected to another code segment or a hardware circuit through transfer and/or reception of information, data, arguments, parameters, or memory content. The information, arguments, parameters, and data may be transferred, sent, or transmitted using a certain proper means that includes memory share, message transfer, token transfer, and network transmission. Additionally, in some aspects, steps and/or operations of methods or algorithms may reside as one, a combination, or a set of codes and/or commands on a machine-readable medium and/or a computer readable medium that may be integrated as computer program things.

In the case of software implementation, the above-described technologies may be implemented by modules (e.g., procedures or functions) that perform the above-described functions. Software codes may be stored in memory modules and may be executed by processors. The memory unit may be implemented in the processor or outside the processor, and in this case, the memory unit may be communicably connected to the processor by various means as is known in the art.

In the case of hardware implementation, processing units may be implemented in at least one of an application-specific integrated circuit (ASIC), a digital signal processor (DSP), a digital signal processing device (DSPD), a programmable logic device (PLD), a field programmable gate array (FPGA), a processor, a controller, a microcontroller, a microprocessor, other electronic units that are designed to perform the functions as described above, and their combinations.

As described above, one or more embodiments are exemplified. All possible combinations of components or methods are not described for the purpose of explaining the above-described embodiments, but those skilled in the art may recognize that many additional combinations and substitutions of various embodiments are possible. Accordingly, the above-described embodiments may include all substitutions, modifications, and changes within the true meaning and scope of appended claims. Further, the term "comprises" and/or "composed of" used in the description and claims means that one or more other components, steps, operation and/or existence or addition of devices are not excluded in addition to the described components, steps, operation and/or devices.

As is used herein, the term "estimate" or "estimation" means a process for determining or estimating the system, environment, and/or user's state from one set of observations that is generally seized by events and/or data. The estimation may be used to identify a specific situation or operation, and may generate, for example, probability distribution of states. The estimation may be in probability, and may be calculation of probability distribution of corresponding states based on consideration of the data or events. The estimation may be technologies that are used to construct upper-level events from one set of events and/or data. Such estimation may estimate new events or operations from a set of observed events and/or stored event data, whether the events are closely correlated in time, and whether the events and data come from one or several events and data sources.

Further, the term "component", "module" or "system", as used in the description of the present disclosure, is not limited thereto, but may include hardware, firmware, hardware and software combination, software, or computer related entity, such as software being executed. For example, a component is not limited to its name, but may be a process that is executed on a processor, a processor, an object, executable execution thread, a program and/or a computer. Exemplarily, an application that is driven on an operation device and an operation device may be components in all. One or more components may reside in a process and/or execution thread, and components may be concentrated into one computer and/or may be distributed between two or more computers. Further, such components may be executed from various kinds of computer readable media in which various kinds of data structures are stored. The components may communicate with each other by a local and/or remote process according to signals having one or more data packets (e.g., data from a local system, another component of a distributed system, and/or a certain component that interacts with other systems by the signal through a network, such as the Internet).

It will be understood that the above-described embodiments are exemplary to help easy understanding of the contents of the present disclosure and do not limit the scope of the present disclosure. Accordingly, the scope of the present disclosure is defined by the appended claims, and it will be construed that all corrections and modifications derived from the meanings and scope of the following claims and the equivalent concept fall within the scope of the present disclosure.

What is claimed is:

1. A cooperative adaptive cruise control (CACC) system that is provided in a subject vehicle to control a driving speed of the subject vehicle, comprising:
  a communication unit configured to receive vehicle information including position and driving information from neighboring vehicles using V2V (Vehicle to Vehicle) communications and to receive messages from infrastructure using V2I (vehicle to infra) communications;
  an information collection unit configured to collect vehicle information of the neighboring vehicles and vehicle information of the subject vehicle using sensors provided on the subject vehicle; and
  a control unit configured to select a target vehicle for being followed by the subject vehicle based on the vehicle information of the neighboring vehicles acquired by the communication unit, and to control the driving speed of the subject vehicle based on speed information of the selected target vehicle,
  wherein the control unit is configured to select the target vehicle by:
    selecting vehicles that travel in the same lane as the subject vehicle as a first group of potential vehicles of interest;
    selecting, from the first group of potential vehicles of interest, vehicles that exist within a predetermined distance as a second group of potential vehicles of interest, wherein distance is measured by at least one of the V2V communication, the V2I communications and the sensor provided on the subject vehicle;
    selecting, from the second group of potential vehicles of interest, vehicles in which a difference between speed information received by the V2V communication or the V2I communication and speed measured by the sensor is within a predetermined value as a third group of potential vehicles of interest; and
    selecting one vehicle in the third group of potential vehicles of interest as the target vehicle to be followed by the subject vehicle.

2. The CACC system according to claim 1, wherein the control unit comprises:
  a state management unit configured to manage the state of the CACC system;
  a target vehicle selection unit configured to select the target vehicle for being followed by the subject vehicle based on the vehicle information of the neighboring vehicles acquired by the communication unit; and
  a driving management unit configured to control the driving speed of the subject vehicle based on the speed information of the selected target vehicle.

3. The CACC system according to claim 2, wherein the state management unit displays the state of the CACC system as one of an off state in which the CACC system does not operate, a standby state in which the CACC system operates, but does not control the driving speed of the subject vehicle, an ACC activation state in which the driving speed of the subject vehicle is controlled using only the information that is acquired from the subject vehicle in a state where there is no vehicle in a region of interest that is connected through the V2V communications or V2I communications, and a cooperative activation state in which there is the neighboring vehicle in the region of interest that is connected through the V2V communications or V2I communications, and the driving speed of the subject vehicle is controlled using the information from the neighboring vehicle that is acquired through the V2V communications or V2I communications and the information that is acquired from the subject vehicle.

4. The CACC system according to claim 3, wherein the cooperative activation state includes a non-follow mode, and wherein the control unit is configured to operate the CACC system in the non-follow mode if the neighboring vehicles exist but the target vehicle does not exist.

5. The CACC system according to claim 3, wherein the cooperative activation state includes a close-follow mode, and wherein the control unit is configured to operate the CACC system in the close-follow mode if the target vehicle which is in communication with the subject vehicle exists.

6. The CACC system according to claim 3, wherein the cooperative activation state includes a follow mode, and wherein the control unit is configured to operate the CACC system in the follow mode if the target vehicle which is not in communication with the subject vehicle exists.

7. The CACC system according to claim 2, wherein the information collection unit comprises a distance sensor configured to sense a front object,
wherein the target vehicle selection unit determines existence of the forward vehicle that travel in the same lane as the lane of the subject vehicle based on the sensing result of the distance sensor.

8. The CACC system according to claim 7, wherein the target vehicle selection unit determines, as the forward vehicle, an object in the driving lane of the subject vehicle that has a width that is equal to or larger than a first predetermined reference width according to the sensing result of the distance sensor.

9. The CACC system according to claim 1, the messages from the infrastructure using V2I (vehicle to infra) communications includes at least one of:
a road speed limit, a time difference between the subject vehicle and the target vehicle and other standard messages from a road side equipment (RSE).

10. The CACC system according to claim 1, the messages from the infrastructure using V2I (vehicle to infra) communications includes at least one of:
a recommended set speed and a time difference between the subject vehicle and the target vehicle.

11. The CACC system according to claim 1, wherein the control unit is configured to control the driving speed of the subject vehicle further based on a gap between the subject vehicle and the target vehicle if the target vehicle is selected.

12. The CACC system according to claim 1, wherein the control unit is configured to control the driving speed of the subject vehicle further based on a target time gap and wherein the target time gap is a value based on the driving speed of the subject vehicle and a gap between the subject vehicle and the forward vehicle.

13. The CACC system according to claim 1, wherein the control unit is further configured to control the driving speed of the subject vehicle based on a target speed of the subject vehicle if the target vehicle is not selected.

14. The CACC system according to claim 13, further comprising a driver vehicle interface (DVI) unit configured to receive an input of a set value including the target speed from a driver and to notify the drive of state information of the CACC system.

15. The CACC system according to claim 1, the control unit is further configured to receive the information of the neighboring vehicles in a region of interest, and wherein the region of interest for the neighboring vehicle has lengths in directions of left, right, front and rear on the basis of the subject vehicle.

16. The CACC system according to claim 15, the control unit is further configured to select potential vehicles of interest (PVOI) in communication with the subject vehicle based on the vehicle information of the neighboring vehicles, wherein the PVOI is vehicles that exert an influence on the speed control of the subject vehicle.

17. The CACC system according to claim 16, wherein the control unit is configured to select the target vehicle from the PVOI.

18. The CACC system according to claim 17, wherein the control unit is configured to select the target vehicle from the PVOI based on at least one of a lane on which the PVOI travels, a position of the PVOI and a speed of the PVOI.

* * * * *